(12) United States Patent
Schonbrun et al.

(10) Patent No.: US 8,368,008 B2
(45) Date of Patent: Feb. 5, 2013

(54) OPTICAL TRAPPING METHODS AND APPARATUS EMPLOYING ONE OR MORE FRESNEL ZONE PLATES

(75) Inventors: Ethan Schonbrun, Newton Highlands, MA (US); Charles Rinzler, Denver, CO (US); Kenneth B. Crozier, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 154 days.

(21) Appl. No.: 12/679,436

(22) PCT Filed: Sep. 23, 2008

(86) PCT No.: PCT/US2008/011033
§ 371 (c)(1),
(2), (4) Date: Jul. 30, 2010

(87) PCT Pub. No.: WO2009/088399
PCT Pub. Date: Jul. 16, 2009

(65) Prior Publication Data
US 2010/0288913 A1    Nov. 18, 2010

Related U.S. Application Data

(60) Provisional application No. 60/974,479, filed on Sep. 23, 2007.

(51) Int. Cl.
*G01N 21/63* (2006.01)
(52) U.S. Cl. ............................. 250/251; 359/15; 359/383
(58) Field of Classification Search .................... 250/251
See application file for complete search history.

(56) References Cited

U.S. PATENT DOCUMENTS

| 3,839,108 A * | 10/1974 | Leinkram .................... 216/48 |
| 4,539,482 A | 9/1985 | Nose |
| 4,878,735 A * | 11/1989 | Vilums ...................... 359/462 |
| 5,074,667 A | 12/1991 | Miyatake |
| 6,815,664 B2 * | 11/2004 | Wang et al. ................ 250/251 |
| 7,556,922 B2 * | 7/2009 | Block et al. ............... 435/6.11 |
| 2005/0146794 A1 * | 7/2005 | Menon et al. ............. 359/619 |

FOREIGN PATENT DOCUMENTS
WO    WO 2007/042989 A    4/2007

OTHER PUBLICATIONS

International Search Report and Written Opinion, Application Serial No. PCT/2010/01355, Jul. 28, 2010.
Wang, Y. et al. Achromatic Fresnel optics for wideband extreme-ultraviolet and x-ray imaging, 2003, Nature, vol. 424, pp. 50-53, abstract; p. 50 col. 2 para 3; p. 51 col. 1 para 1, Fig. 1a.
Wu, J. et al. The application of Fresnel zone plate based projection in optofluidic microscopy, 2008, Optics Express, vol. 16, No. 20, pp. 15598-15602, abstract; p. 15597 para 4, 5, Fig. 1; p. 15599 para 3, p. 15600 para 1.

(Continued)

*Primary Examiner* — Phillip A Johnston
(74) *Attorney, Agent, or Firm* — Wolf, Greenfield & Sacks, P.C.

(57) ABSTRACT

Methods and apparatus (1100) for trapping fluid-borne object (s) (212) using one or more Fresnel zone plates (202) located in proximity to a fluid medium (208). Optical tweezers based on one or more Fresnel zone plates may be integrated with a microfluidic structure (e.g., chambers, channels) (1104) of various geometries so as to form one or more optical traps (215) within a fluid medium contained by the microfluidic structure(s). Three-dimensional trapping of objects can be obtained with stiffness comparable to that of conventional optical tweezers based on a microscope objective. In one example, a single Fresnel zone plate is particularly configured to form multiple optical traps upon irradiation, so as to trap multiple objects simultaneously. Exemplary applications of the methods and apparatus disclosed herein include determination of various fluid medium properties (e.g., velocity, refractive index, viscosity, temperature, pH) and object sorting.

29 Claims, 17 Drawing Sheets

OTHER PUBLICATIONS

Attwood, D., *Soft x-rays and extreme ultraviolet radiation*, Chapter 9, paragraph 9.10:"Zone plate fabrication," Cambridge University Press 2000, pp. 385-389.

International Search report and Written Opinion for International Application No. PCT/US2008/011033 mailed Aug. 24, 2009.

Overton, G., "Zone-plate optical tweezer can integrate with microfluidics," *Laser Focus World* 44(6):46, 48-49, Jun. 1, 2008, Pennwell, Tulsa, Oklahoma, USA.

Schonbrun et al., "Spring constant modulation in a zone plate tweezer using linear polarization," *Optics Letters* 33(17):2017-2019, Optical Society of America, Washington, D.C. Sep. 1, 2008.

Sun et al., "Transport and separation of microspheres with lensless imaging," *Proc. SPIE* vol. 6644, Sep. 7, 2007, Internat'l Soc. For Optical Engineering, Optical Trapping and Optical Micromanipulation IV 2007 SPIE US.

Visscher et al., "Construction of Multiple-Beam Optical Traps with Nanometer-Resolution Position Sensing," *IEEE J Selected Topics in Quantum Electronics* 2(4):1066-1076, Dec. 1, 1996, IEEE Service Center, Piscataway, New Jersey, US.

Wohland et al., "Theoretical determination of the influence of the polarization on forces exerted by optical tweezers," *OPTIK* 102(4):181-190, 1996.

* cited by examiner

US 8,368,008 B2

OPTICAL TRAPPING METHODS AND APPARATUS EMPLOYING ONE OR MORE FRESNEL ZONE PLATES

RELATED APPLICATIONS

This application is a U.S. national stage application under 35 U.S.C. §371 of International Application No. PCT/US2008/011033, filed Sep. 23, 2008, and entitled "OPTICAL TRAPPING METHODS AND APPARATUS EMPLOYING ONE OR MORE FRESNEL ZONE PLATES," which claims benefit under 35 U.S.C. §119(e) of U.S. Provisional Application No. 60/974,479, filed Sep. 23, 2007, entitled "METHODS AND APPARATUS FOR ON CHIP TRAPPING WITH A WATER IMMERSION ZONE PLATE," the entire contents of both of which are herein incorporated by reference in their entireties.

GOVERNMENT SPONSORED RESEARCH

Some of the research relating to the subject matter disclosed herein was sponsored by the United States National Science Foundation and the Defense Advanced Research Projects Agency (DARPA) Grant No. HR001-06-1-0044, and the United States government has certain rights to some disclosed subject matter.

BACKGROUND

Microfluidic manipulation of nanometer- and micrometer-sized fluid-borne objects has become an important tool in the biological sciences. Some conventional manipulation techniques may employ a focused laser beam to create an optical trap behind a focus of the beam in which one or more objects may be held. Such systems are commonly referred to in the relevant art as "optical tweezers."

Trapped objects can be used to exert forces on, or measure forces from, their local environments in a non-contact manner, with calibration performed using Hooke's Law. Optical traps have been used for quantitative observations of biological processes, examples of which include a motion of kinesin motor molecules and a force generated by RNA polymerase as it moves along a DNA molecule.

Performance of an optical trap depends on characteristics of the optical focusing element used to create the trap. In conventional optical tweezers, a laser beam typically is focused using a microscope objective lens. FIG. 1 shows an example of a conventional optical tweezers 100, in which a focused laser beam 101 passes through a large numerical aperture lens 102. To obtain a stiff three-dimensional optical trap, the conventional optical tweezers employ an oil or water immersion objective lens to produce an axial intensity gradient large enough to counter the scattering force from small angle rays. In the optical tweezers shown in FIG. 1, immersion oil 110 is placed between lens 102 and a coverslip 104. An object 106 suspended in water 108 is trapped in optical trap 105 which essentially coincides with the waist or focal spot of the laser beam 101 after passing through the lens 102.

A conventional high performance microscope objective lens typically employed in optical tweezers such as shown in FIG. 1 have extremely short working distances, e.g., from 100-1000 µm and usually less than 200 µm. Moreover, the microscope objective lens typically has a barrel width and length of 3 and 6 cm, respectively. Because of the large size and high cost of such lenses used in the conventional optical tweezers, they are generally considered impractical to integrate into microfluidic devices.

SUMMARY

Applicants have recognized and appreciated that some of the shortcomings of current optical tweezers designs may be overcome by replacing a conventional microscope objective lens with a smaller focusing optic that is relatively easy to fabricate and facilitates integration with other components, such as fluid support and containment structures.

In view of the foregoing, the present disclosure is directed generally to inventive methods and apparatus for producing an optical trap using one or more Fresnel zone plates. In exemplary embodiments described herein, a conventional optical tweezers design is modified by replacing the large immersion objective lens with a smaller focusing optic in the form of a Fresnel zone plate so as to facilitate use for a wider variety of applications. The smaller size and ease of fabrication of the novel focusing optic disclosed herein according to various embodiments also may allow for the incorporation of such optics into a larger variety of optical tweezers systems.

Applicants have appreciated that the focusing optic is a significantly important element in an optical tweezers, and in various aspects the concepts disclosed herein in connection with a Fresnel zone plate provide a substantial modification to traditional optical tweezers approaches. Considerable flexibility can be added to optical trapping applications by taking advantage of a Fresnel zone plate's much smaller cross section, thickness, and weight. Optical tweezers can be imbedded deep inside fluidic structures to facilitate creation of optical traps without the limitation of an immersion objective's small working distance. In other aspects trapping may be decoupled from imaging, thereby allowing traps to be translated and extremely long working distance objectives to be used for imaging. In various embodiments described below, optical tweezers using one or more Fresnel zone plates have a stiffness comparable to traditional optical tweezers. Further, because of the flexibility of the lithographic process used to fabricate Fresnel zone plates, optical tweezers based on the methods and apparatus disclosed herein can be designed to implement functions that objective lenses can not perform.

At large numerical apertures (NAs), Applicants have recognized that a Fresnel zone plate forms a focal spot that is more elliptical than that produced by a conventional objective lens having the same NA. Accordingly, in one embodiment, this property of Fresnel zone plates is exploited to vary a stiffness of an optical trap by changing a linear polarization angle of the laser radiation incident to the zone plate. By changing the linear polarization angle, the stiffness of the trap can be modulated without changing the incident laser power or a location of a center of the trap.

In exemplary implementations, methods and apparatus employing one or more Fresnel zone plates according to inventive embodiments disclosed herein may be utilized in integrated systems such as microfluidic chambers or a "lab-on" chip. Fresnel zone plates are characterized by small size and ease of fabrication, and in one implementation disclosed herein an array of Fresnel zone plates may be integrated with a microfluidic device. According to inventive methods disclosed herein, multiple Fresnel zone plates may be used for determining various properties of fluids mediums (e.g., velocity, refractive index, viscosity, temperature or/and pH of the fluid). In another embodiment, a sorting method employs multiple optical traps for sorting objects based on one or more of their size and refractive index, and/or on properties of the fluid medium.

In yet another embodiment, Fresnel zone plates may be designed so that multiple objects may be trapped using a single Fresnel zone plate.

In sum, one embodiment of the present invention is directed to an optical trapping method. The method comprises placing at least one Fresnel zone plate in proximity to a fluid medium, wherein at least one fluid-borne object is disposed in the fluid medium. Further, the method comprises irradiating the at least one Fresnel zone plate with at least first radiation so as to form at least one focal spot of the first radiation within the fluid medium for trapping the at least one fluid-borne object.

Another embodiment is directed to an optical trapping apparatus comprising a chamber for carrying a fluid medium and at least one Fresnel zone plate disposed on at least a portion of the chamber.

Another embodiment is directed to a method comprising measuring at least one property of a fluid medium via at least one Fresnel zone plate disposed in proximity to the fluid medium, wherein at least one fluid-borne object is disposed in the fluid medium.

Another embodiment is directed to a method of sorting a plurality of fluid-borne objects disposed in a fluid medium. The method comprises placing at least one Fresnel zone plate in proximity to the fluid medium; irradiating the at least one Fresnel zone plate with at least first radiation so as to form a plurality of focal spots of the first radiation within the fluid medium for trapping at least one of the plurality of fluid-borne objects; and sorting the plurality of fluid-borne objects based on at least one characteristic of the plurality of objects or the fluid medium.

Another embodiment is directed to an optical trapping apparatus, comprising a substrate for carrying a fluid medium, wherein a plurality of fluid-borne objects are disposed in the fluid medium, and a Fresnel zone plate disposed on at least a portion of the substrate. Upon irradiation of the Fresnel zone plate with at least first radiation, a plurality of focal spots of the first radiation are formed within the fluid medium for trapping the plurality of fluid-borne objects It should be appreciated that all combinations of the foregoing concepts and additional concepts discussed in greater detail below (provided such concepts are not mutually exclusive) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present invention is directed generally to methods and apparatus for optically trapping fluid-borne objects disposed in a fluid medium. In various embodiments described in detail below, such methods and apparatus employ one or more Fresnel zone plates to create one or more optical traps; in particular, one or more Fresnel zone plates are disposed in proximity to the fluid medium and, when irradiated with a focused laser beam, form one or more optical traps for trapping fluid-borne objects at a focal spot of a corresponding zone plate. Fresnel zone plates may comprise gold, polymer or any other suitable material.

One drawback of conventional trapping geometries is that it is difficult to move the trapping field with respect to the objects suspended in a fluid medium. Typically, conventional optical trapping techniques have relied on waiting for an object being trapped to diffuse into the trapping region. Some embodiments of the present disclosure provide an optical tweezers system that facilitates loading of an object into the optical trap without having to wait for the object to diffuse into the trap.

To efficiently utilize an optical trap using the Fresnel zone plate, the trap may be calibrated. For these purposes, characteristics of the trap and a fluid medium containing an object to be trapped may be varied and a position of the trapped object may be tracked.

Figure 1:
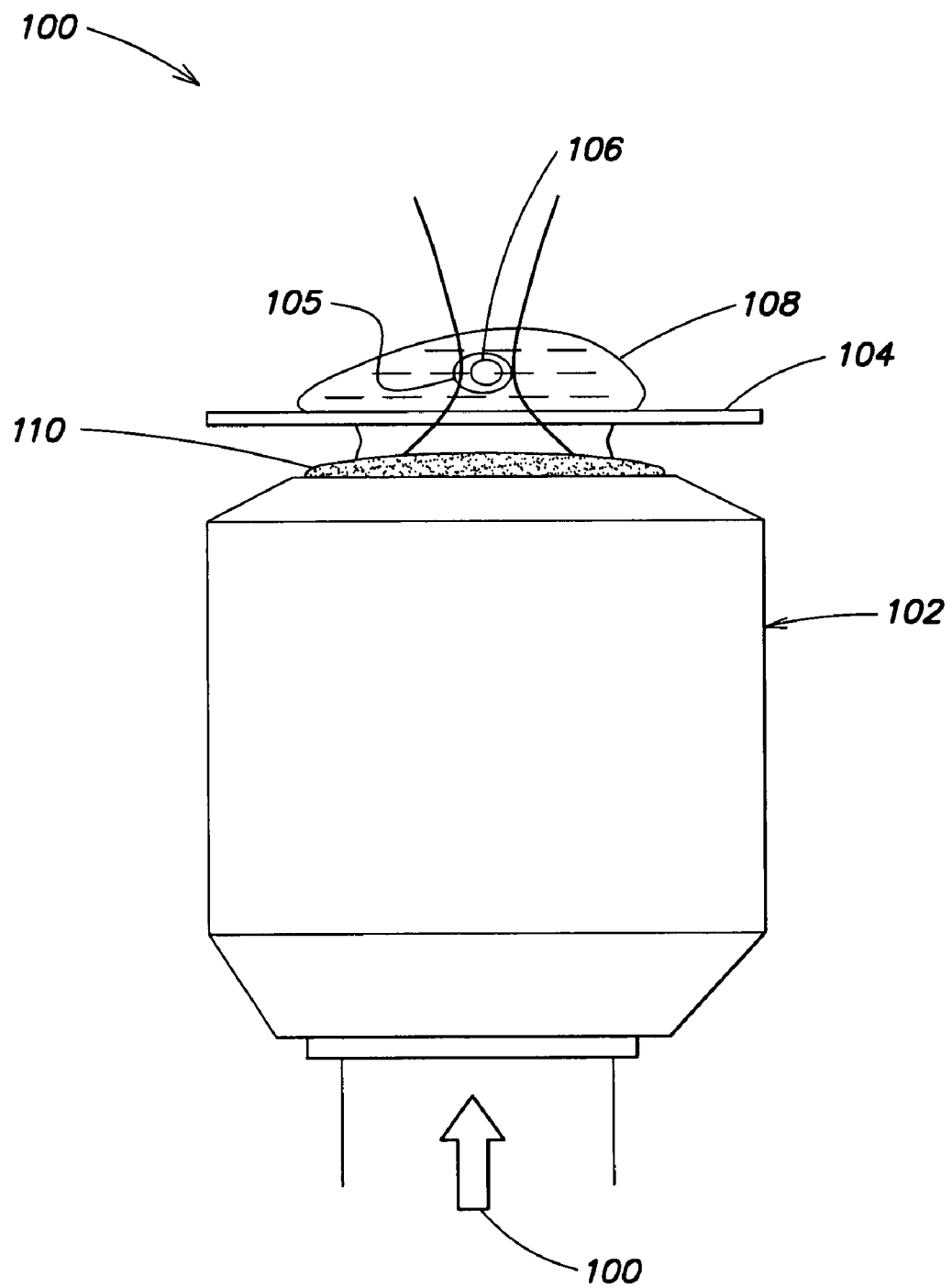
FIG. 1 is a schematic diagram of a conventional optical tweezers employing a microscopic objective lens.
Figure 2:
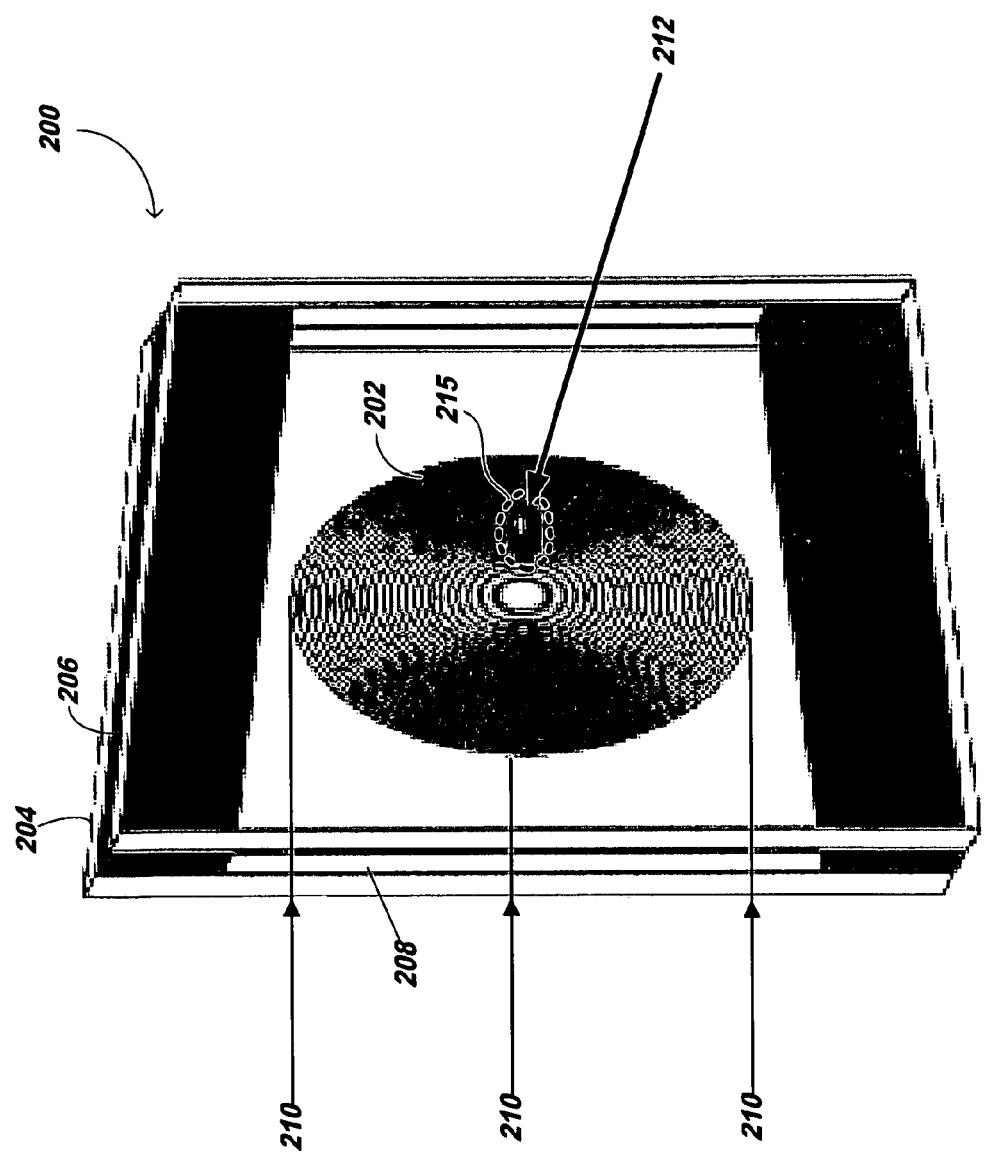
FIG. 2 illustrates general structure of an optical tweezers including a Fresnel zone plate, according to one embodiment of the present invention.

FIG. 2 illustrates an optical tweezers apparatus 200 according to one embodiment of the present invention. The apparatus 200 comprises a Fresnel zone plate 202 disposed on a substrate 204 which is placed in proximity to a fluid medium 208. A cover 206, for example, a glass coverslip, is placed with respect to the substrate 204 so as to retain the fluid medium. In some embodiments, the Fresnel zone plate 202 is in contact with the fluid medium and thus is disposed at a substrate/fluid interface. This allows the use of a short focal length design, enabling the numerical aperture to be close to its theoretical maximum (e.g., refractive index of water).

FIG. 2 shows a fluid-borne object 212 located within the fluid medium 208 and trapped by a region of focused radiation, or a focal spot 215, created by the Fresnel zone plate 202 when the zone plate is irradiated by collimated laser radiation 210. While the focal spot 215 is shown in FIG. 2 as being slightly larger than the trapped object 212, it should be appreciated that the invention is not limited in this respect and that the focal spot 215 may in some instances be smaller than the trapped object 212. Examples of objects 212 that may be trapped by the tweezers 200 include, but are not limited to, a dielectric object (e.g., a polystyrene latex bead of a spherical, elliptical, or any other suitable shape), a semiconductor object, a metallic object, a biological object (e.g., one or more biological molecules, a cell, or a tissue sample).

Figure 3A:
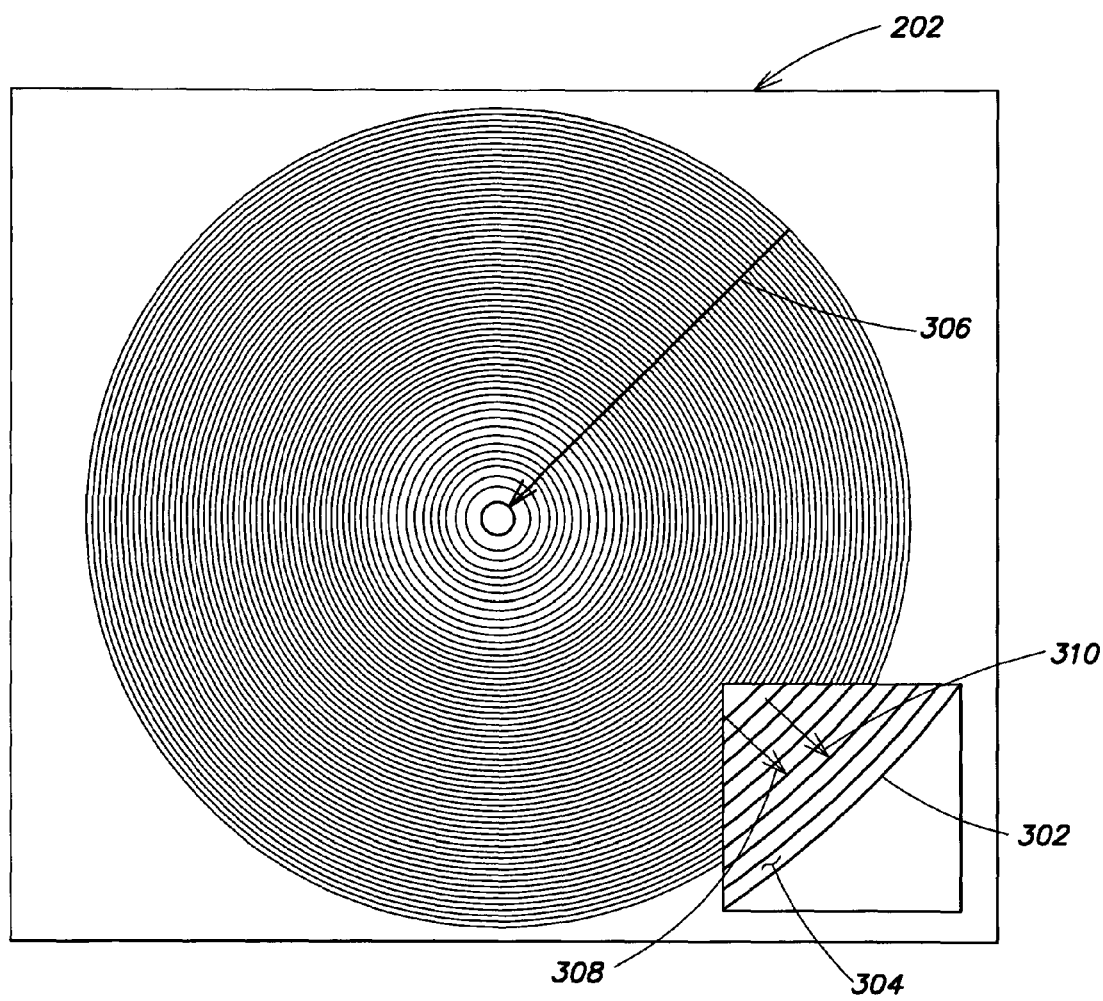
FIG. 3(a) is an optical micrograph of a Fresnel zone plate, according to one embodiment of the present invention.

FIG. 3(a) is an optical image of an exemplary Fresnel zone plate 202 fabricated onto a glass microscope slide serving as the substrate 204 of FIG. 2. A Fresnel zone plate is a diffractive element that comprises alternating concentric rings of a metal, a polymer or other suitable material. A collimated laser beam irradiating the Fresnel zone plate, as shown in FIG. 2, is diffracted and the diffracted waves interfere constructively to form a region of highly focused radiation or "focal spot." An object (e.g., a dielectric particle) in the vicinity of the focal spot experiences a force that pulls it to the focal spot where the object is thus trapped.

In some embodiments of the present invention, the Fresnel zone plate may be made from a metal such as, for example, gold. The concentric rings of the Fresnel zone plate may be created by coating a glass slide as a starting substrate with a thin layer of indium tin oxide (ITO) to prevent charging during lithography. Polymethylmethacrylate (PMMA) is then spun on the substrate and exposed by e-beam lithography. Gold is evaporated to an exemplary thickness of 50 nm, with a thin layer of chrome used for adhesion. Liftoff is then performed, yielding a Fresnel zone plate with alternating regions of gold and glass, as shown in FIG. 3(a), wherein the light regions 302 are gold (e.g., a 50 nm gold layer) and the dark regions 304 are glass where the gold has been removed.

In one exemplary implementation, a diameter of the Fresnel zone plate, shown as 306 in FIG. 3(a), is 100 μm and its focal length is 8 μm, yielding an effective numerical aperture (NA) of 1.31. It should be appreciated, however, that the present invention is not limited to any particular Fresnel zone plate and zone plates characterized by various parameters may be employed. In FIG. 3(a), a radius of an $n^{th}$ ring and a radius of an $n+1^{th}$ ring are shown by way of example as 308 and 310, respectively. A radius of each concentric ring (e.g., each transition from a dark region to a light region) of the Fresnel zone plate can be defined as $\sqrt{n\lambda f + n^2\lambda^2/4}$, where n is an integer, f is the focal length and λ is the wavelength in water of radiation incident to the zone plate. Due to the short focal length, the quadratic term under the radical dominates for the higher rings, and the period of concentric rings quickly reaches close to the diffraction limit of nλ/2. Such a Fresnel zone plate may be illuminated with laser radiation 210 having a wavelength in a range of from approximately 970 to 990 nm produced by a fiber-coupled lased diode. For example, the wavelength of λ=976 in a free space corresponding to a wavelength in water of λ=735 nm may be used. At the outermost ring of this zone plate, the period is 745 nm, which is slightly larger than λ.

Figures 3B, 3C:
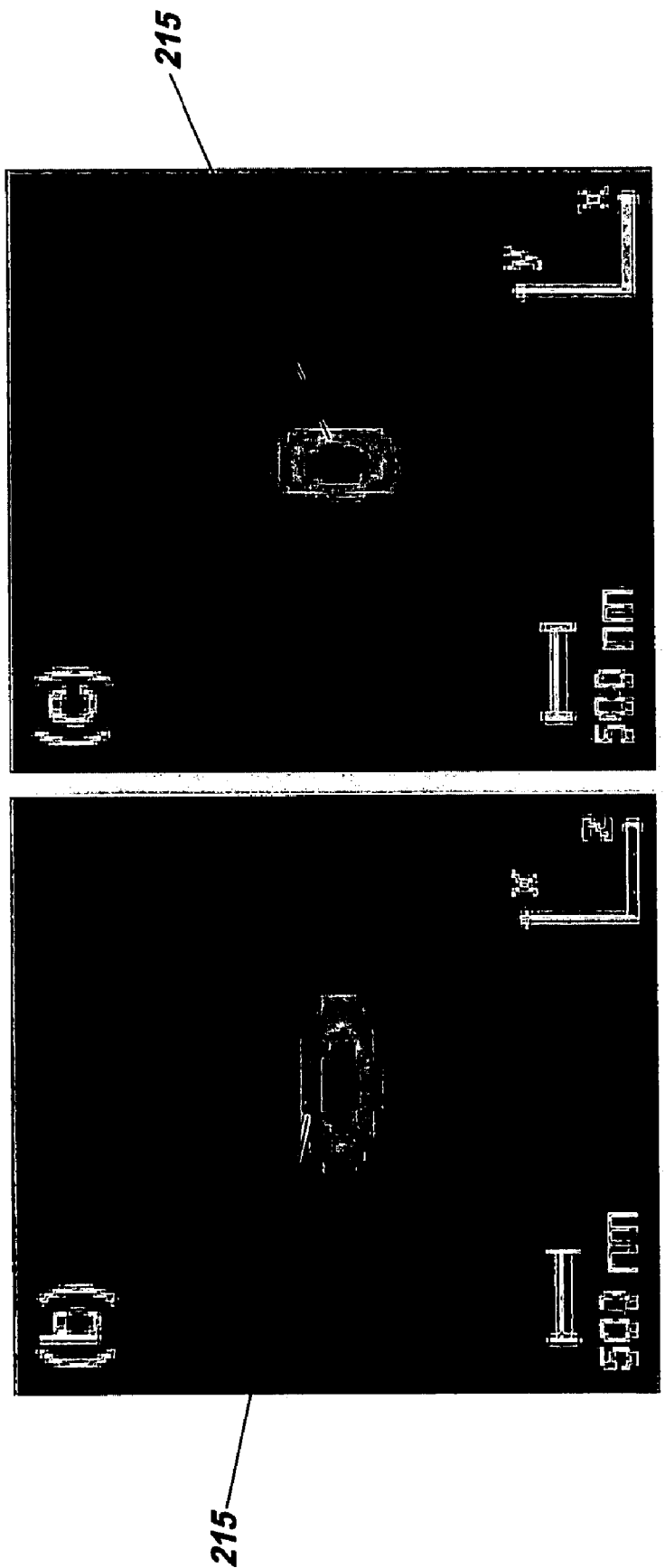
FIG. 3(b) illustrates a simulated axial (x-z plane) intensity distribution of a focal spot formed by a Fresnel zone plate, according to one embodiment of the present invention.
FIG. 3(c) illustrates a cross-section (x-y plane) intensity distribution of a focal spot formed by a Fresnel zone plate, according to one embodiment of the present invention.

The performance of such a Fresnel zone plate may be evaluated using two-dimensional split-step Fourier beam propagation (BP) algorithm. For this purpose, a non-paraxial scalar code is modified to account for the smaller than unity modulation depth of interfering vector field components. The Fresnel zone plate is treated as a thin element and reflections from its surface are ignored. The propagation direction is taken as the z-axis, and the input beam is polarized along the y-axis. FIG. 3(b) shows an yz-plane cross-section of the intensity through the focal spot 215 of the laser beam, which yields an axial full width at half maximum (FWHM) of 764 nm along the z-axis. FIG. 3(c) shows a cross-section of the intensity at the focal plane in the x-y-plane. In this example, the size of the focal spot 215 has a FWHM of 302 nm along the x-axis and 473 nm along the y-axis. Around the focal spot region there are numerous sidelobe peaks, but their peak intensity is less than 1/10 of the intensity of the central peak. The gold rings of the zone plate are modeled as partially-transmitting regions with a transmission coefficient of 0.1.

As discussed above, in conventional optical traps, it may be difficult to move a trapping field with respect to the objects suspended in a fluid medium. Therefore, it typically takes a certain amount of time for an object being trapped to diffuse into the trapping region. In view of the foregoing, some embodiments of the invention provide additional elements to an optical tweezers apparatus that facilitate loading of the object into the optical trap. Thus, while the zone plate needs very little supporting equipment to form an optical trap, in order to more effectively load the trap and characterize its performance one exemplary embodiment is directed to an optical tweezers and imaging system schematically shown in FIG. 4.

Figure 4:
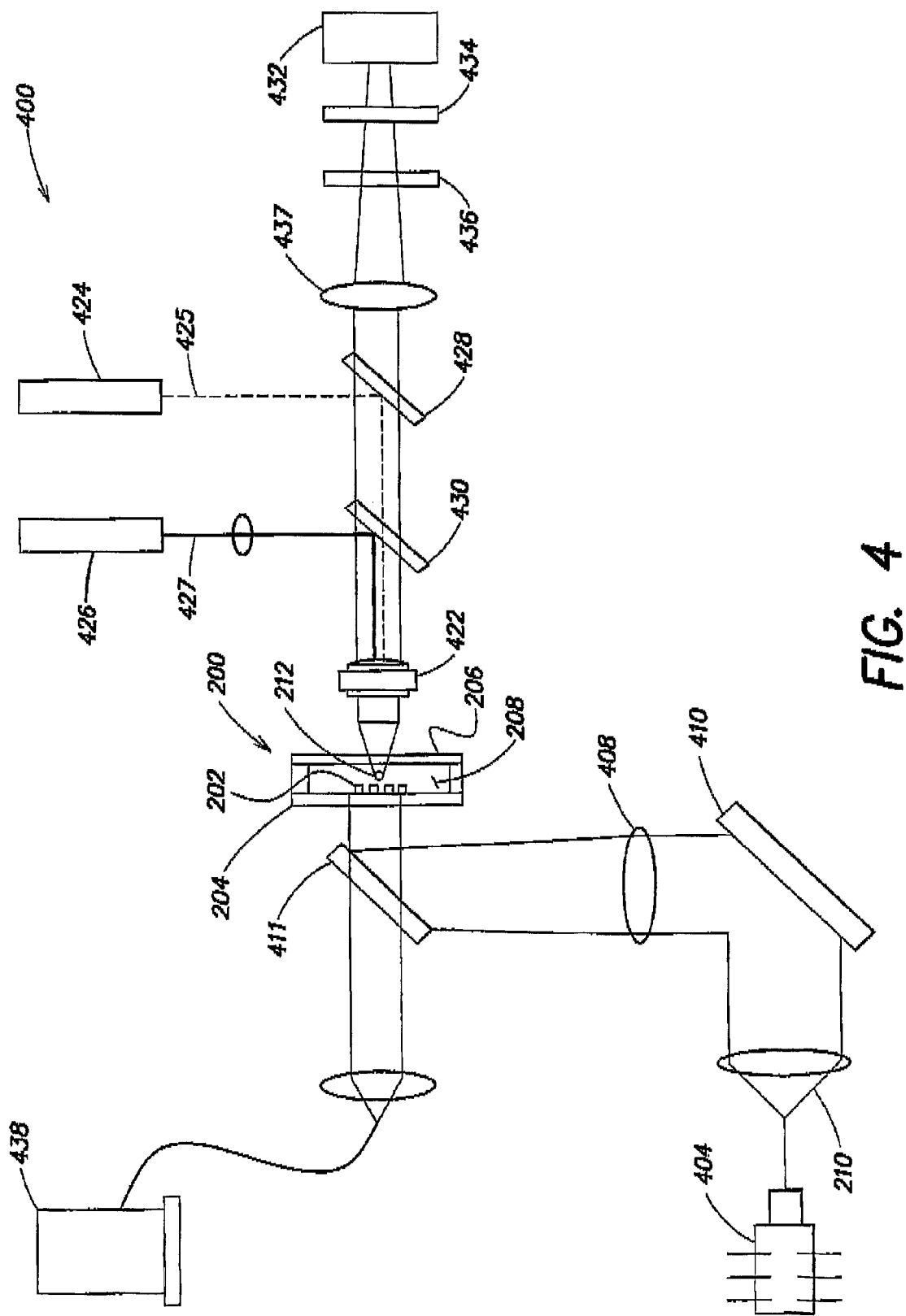
FIG. 4 is a schematic diagram of an optical tweezers system including a Fresnel zone plate, according to one embodiment of the present invention.

As shown in FIG. 4, an optical tweezers and imaging system 400 according to one embodiment of the present invention includes the optical tweezers apparatus 200 shown in FIG. 2 together with a trap loading laser focused by a microscope objective as described below. Unlike traditional optical tweezers, once an object is trapped by a focal spot of the Fresnel zone plate, the sample cell can be translated tens of microns and the object remains fixed with respect to the sample cell.

In the system of FIG. 4, a laser beam 210 emitted by a fiber coupled diode laser 404 and having a wavelength of $\lambda_o=976$ nm is collimated and focused onto Fresnel zone plate 202 having a diameter of 100 μm using a lens 408. A focal length of lens 408 may be, for example, 200 mm. Laser beam 210 is reflected by dichroic mirror 410 and dichroic mirror 411, to impinge upon the substrate 204 of the apparatus 200 with a beam of a diameter of 180 μm which overfills the Fresnel zone plate 202 having the 100 μm diameter. Fluid-borne object 212 in the fluid medium (e.g., fluorescent beads with diameters of 2 μm) may be trapped at a focal spot (e.g., focal spot 215 shown in FIG. 2) of the Fresnel zone plate; thus, the focal spot formed by the Fresnel zone plate irradiated with the laser beam 210 provides an optical trap.

In the system of FIG. 4, a trap loading laser 424 and a fluorescence laser 426 emit respective radiation beams 425 and 427 that are directed toward the optical tweezers apparatus 200 via dichroic mirrors 428 and 430. Laser beam 425 facilitates loading of the objects into the optical trap, and may be a HeNe laser having a wavelength of 976 nm and a power of, for example, 10 mW. The fluorescence laser beam 427 is focused to a spot size of approximately 10 μm to provide broad illumination to the trapped object 212, and trap loading laser beam 425 is focused onto the object via microscope objective 422. In this example, laser beam 425 is tightly focused to approximately a 1 μm spot size with a 0.8 NA that is also used for imaging. In one exemplary implementation, once the object 212 is trapped by the optical tweezers apparatus 200, laser 426 is turned on and laser 424 is turned off. Laser 426 may be, for example, a green laser ($\lambda_o=532$ nm) that is used to excite fluorescent emission from the trapped objects, which are then imaged by microscope objective 422 onto a charge-coupled device (CCD) camera 432. Thus, microscope objective 422 focuses laser beam 425 to a certain spot size, laser beam 427 to a certain spot size, and is used for imaging the counter propagating light which is the fluorescent emission from the trapped objects. A lowpass filter 434 and a bandpass filter 436 as well as dichroic mirrors 428 and 430 are used to block laser beams 210, 425 and 427 so that only the fluorescent emission is imaged by CCD camera 432. A lens 437 is used for focusing the returning fluorescent emission from the trapped objects. A lamp 438 (e.g., a tungsten lamp) is used for white light illumination to facilitate a set-up of operation of the system.

Figure 5:
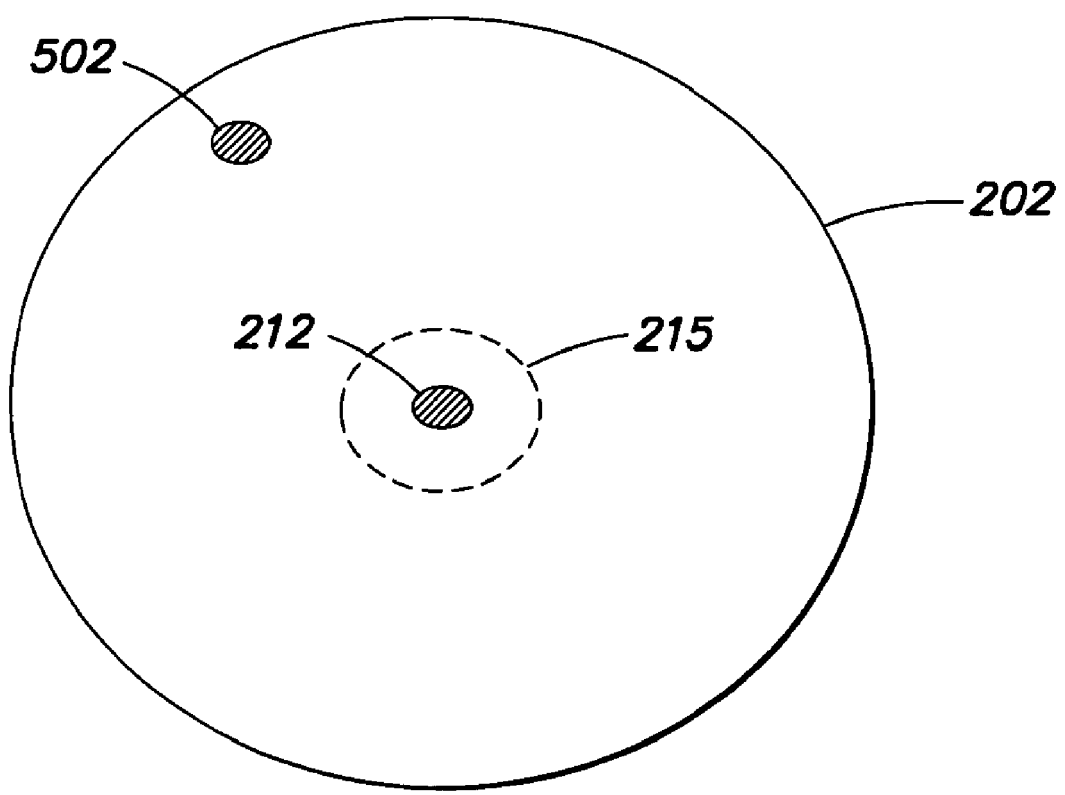
FIG. 5 schematically shows a polystyrene bead trapped at a focal spot formed by an irradiated Fresnel zone plate, according to one embodiment of the present invention.

FIG. 5 schematically shows an object 212, such as a polystyrene bead for example, trapped at the focal spot 215 of a Fresnel zone plate 202. A bead 502 that has not been trapped is shown as well. Applicants have observed that, after releasing the 2 μm diameter beads from the external HeNe loading trap created by laser beam 425, approximately half of the 2 μm beads are typically trapped by the focal spot 215.

Performance of an optical trap formed at the focal spot 215 may be evaluated by determining a stiffness of the trap. An optical trap may be compared to a simple spring, which follows the Hooke's law. For the spring, a "spring constant" is a measure of a stiffness of the spring. Similarly, for purposes of description of embodiments of the present invention, the spring constant of an optical trap describes a stiffness of the trap. For purposes of the present disclosure, the stiffness of an optical trap is defined as one or more forces exerted upon a fluid-borne object 212 by the focal spot 215. In order to determine a stiffness of the optical trap, a movie of trapped beads is acquired via the CCD camera 432 (e.g., at 30 Hz) to capture object motion as a function of time. Centroid calculations are then performed on the images (respective frames of the movie) to track the bead position. A stiffness $k_{trap}$ of the optical trap may then be determined using the equipartition theorem, $$\frac{1}{2}k_B T = \frac{1}{2}k_{trap}\langle(x - x_{mean})^2\rangle \qquad (1)$$

where $k_B$ is Boltzmann's constant, T is absolute temperature, and $\langle(x-x_{mean})^2\rangle$ is the variance of the object from its trapped equilibrium position. Knowledge of the object's instantaneous position as a function of time therefore enables the stiffness $k_{trap}$ to be determined. However, detection systems such as CCD cameras and photodiodes do not measure the instantaneous position of an object. The measured position is an average of a true position over the integration time, leading to motion blur. This introduces a systematic bias into the measured variance, although it may be corrected for. The true and measured variances, var(X) and var($X_{expt}$) are related by:

$$\mathrm{var}(X_{expt})=\mathrm{var}(X)S(k_{trap},W,\tau) \qquad (2)$$

where $S(k_t, W, \tau)$ corrects for the motion blur, and is a function of $k_{trap}$, the exposure time W and the relaxation time $\tau$. In one exemplary implementation, the exposure time W may be on the order of 1/64 seconds. The relaxation time is give by: $\tau=2\pi\gamma/k_{trap}$, where $\gamma$ is the Stoke's drag coefficient. To determine $k_{trap}$, Equations (1) and (2) are combined to give:

$$\mathrm{var}(X_{expt}) = \frac{k_B T}{k_{trap}}S(k_{trap}, W, \tau) \qquad (3)$$

Equation (3) is solved numerically to find $k_{trap}$ from the measured variance Var($X_{expt}$).

In some exemplary implementations involving the optical tweezers apparatus disclosed herein, thee optical trap(s) generated suing such apparatus may be calibrated to facilitate effective use. For example, a position of the trapped object relative to a center of the focal spot may be measured, as disclosed above. The stiffness of an optical trap may depend on a power of the applied laser radiation, as shown below in FIGS. 6A and 6B. Thus, the stiffness of the trap may be varied by changing the power of the laser radiation.

Figure 6A:
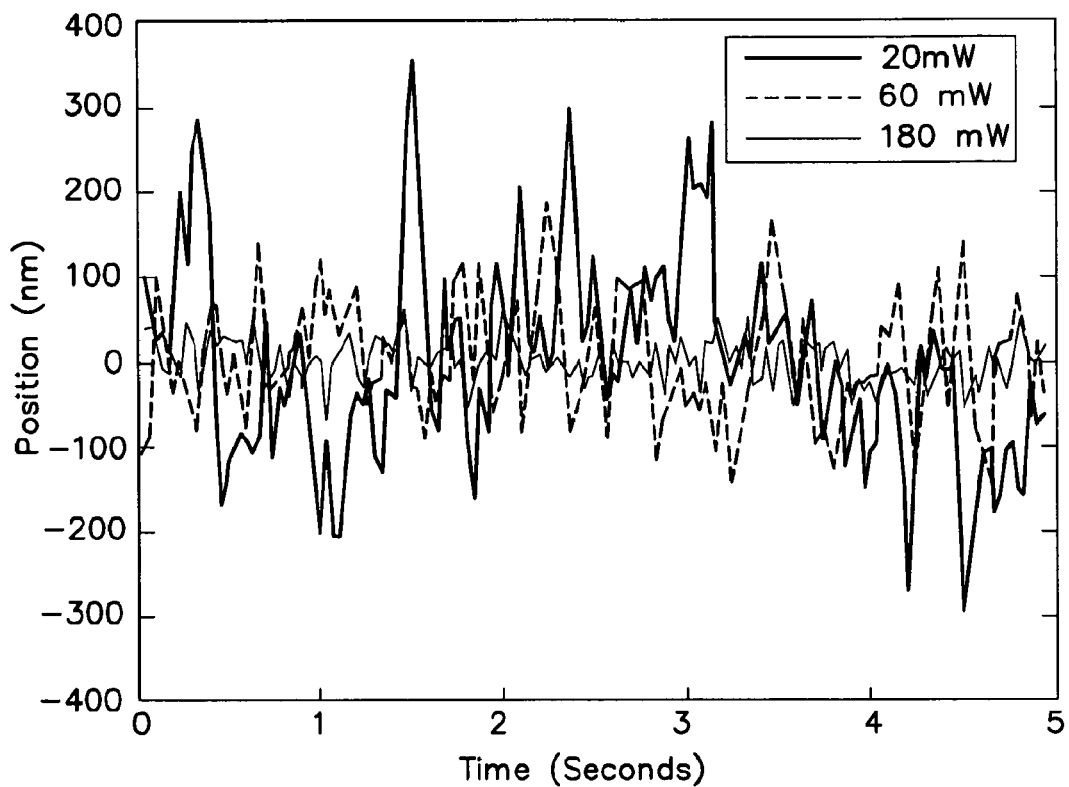
FIG. 6(a) is a graph of a position of a trapped object along the x axis as a function of time for different levels of laser power irradiating a Fresnel zone plate, according to one embodiment of the present invention.
Figure 6B:
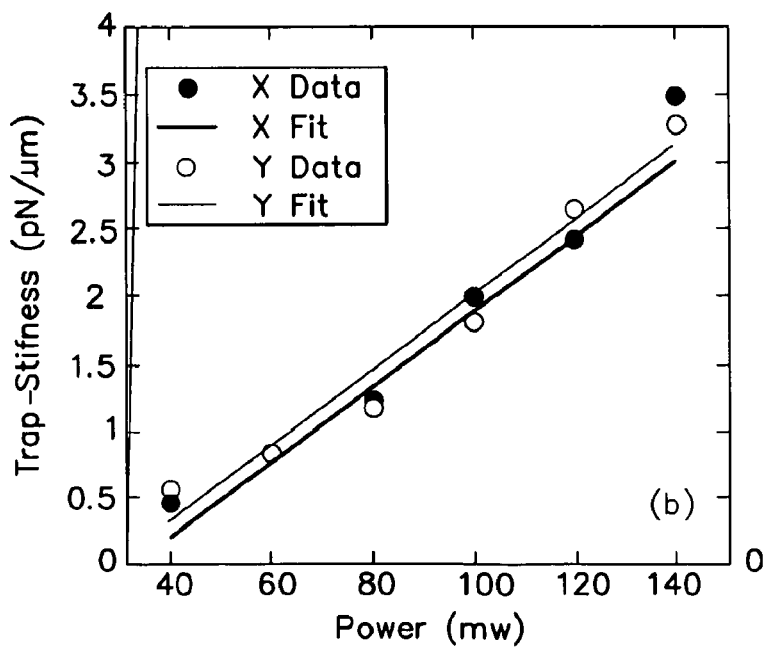
FIG. 6(b) is a graph of a stiffness of an optical trap formed by an irradiated Fresnel zone plate along x and y axes as a function of incident laser power, according to one embodiment of the present invention.

FIG. 6(a) illustrates three traces of a position of a trapped object such as a polystyrene bead with a diameter of 2 μm for three different exemplary levels of laser power, namely, 20, 60, and 180 mW. The variance of the bead position is inversely proportional to laser power. The measured trap stiffness, $k_{trap}$, with motion blur corrected for, is plotted in FIG. 6(b) as a function of laser power, which ranges from approximately 40 to 140 mW. A linear fit of the curves yields a power-normalized value of the trap stiffness 0.0294 pN/μm·mW along the x-axis and 0.0277 pN/μm·mW along the y-axis. There is an offset in the linear fit that results in a zero trap stiffness at 31 and 28 mW for the x and y curves, respectively. At powers below these values, stable trapping may not be described by a linear fit because the trap is no longer harmonic at the shallow depth. At high levels of laser power, the trap stiffness also deviates from linear. At powers of 160 and 180 mW, the stiffness continues to increase, but convection currents in the trap tend to destabilize the performance.

In some exemplary implementations described above, the laser beam (e.g., laser irradiation 210) of the diameter of 180 μm overfills the Fresnel zone plate of the diameter of 100 μm. Overfilling the Fresnel zone plate aperture reduces the trap intensity of the laser irradiation 210 by a factor of four, which results in a stiffness of approximately one tenth of the theoretical optimum of 1 pN/μm·mW for a 2 μm polystyrene sphere using a 1.4 NA conventional objective lens. This factor of ten can be traced to the diffraction efficiency of a binary amplitude grating, which is $1/\pi^2$. In other embodiments using a π phase Fresnel zone plate, the stiffness may be increased by an additional factor of 4. Notwithstanding, exemplary value for the stiffness of a trap created by an optical tweezers apparatus employing a Fresnel zone plate compare well to conventional "high performance" optical traps which have values of approximately 0.1 pN/μm·mW.

According to another aspect of the present invention, at large numerical apertures, a Fresnel zone plate produces a focal spot that is more elliptical than that produced by a conventional objective lens with the same numerical aperture. Applicants have appreciated that this property of Fresnel zone plates having high NA may be used to modulate the stiffness of an optical trap by rotating a linear polarization. Thus, some embodiments of the invention utilize this above property of Fresnel zone plates to provide optical trapping method and apparatus wherein the stiffness of a trapping depends at least in part on the linear polarization of the incident irradiation.

In addition to the NA, an apodization factor of the focusing element also has a significant effect on the field distribution in the focal spot. The apodization factor of an aplanatic lens is $\cos^{1/2} \alpha$, wherein α is the focusing "cone factor," which approaches zero for large angle rays (as α approaches π/2). However, the apodization factor for a flat diffractive lens is $\cos^{-3/2} \alpha$, which diverges for large angle rays. The result is that beams focused by Fresnel zone plates with high NA carry the majority of their energy in the large angular region of their spatial frequency spectrum. Other approaches for increasing the relative energy in large angle rays include using a central field stop or a higher order Gauss-Laguerre beam.

Figure 7:
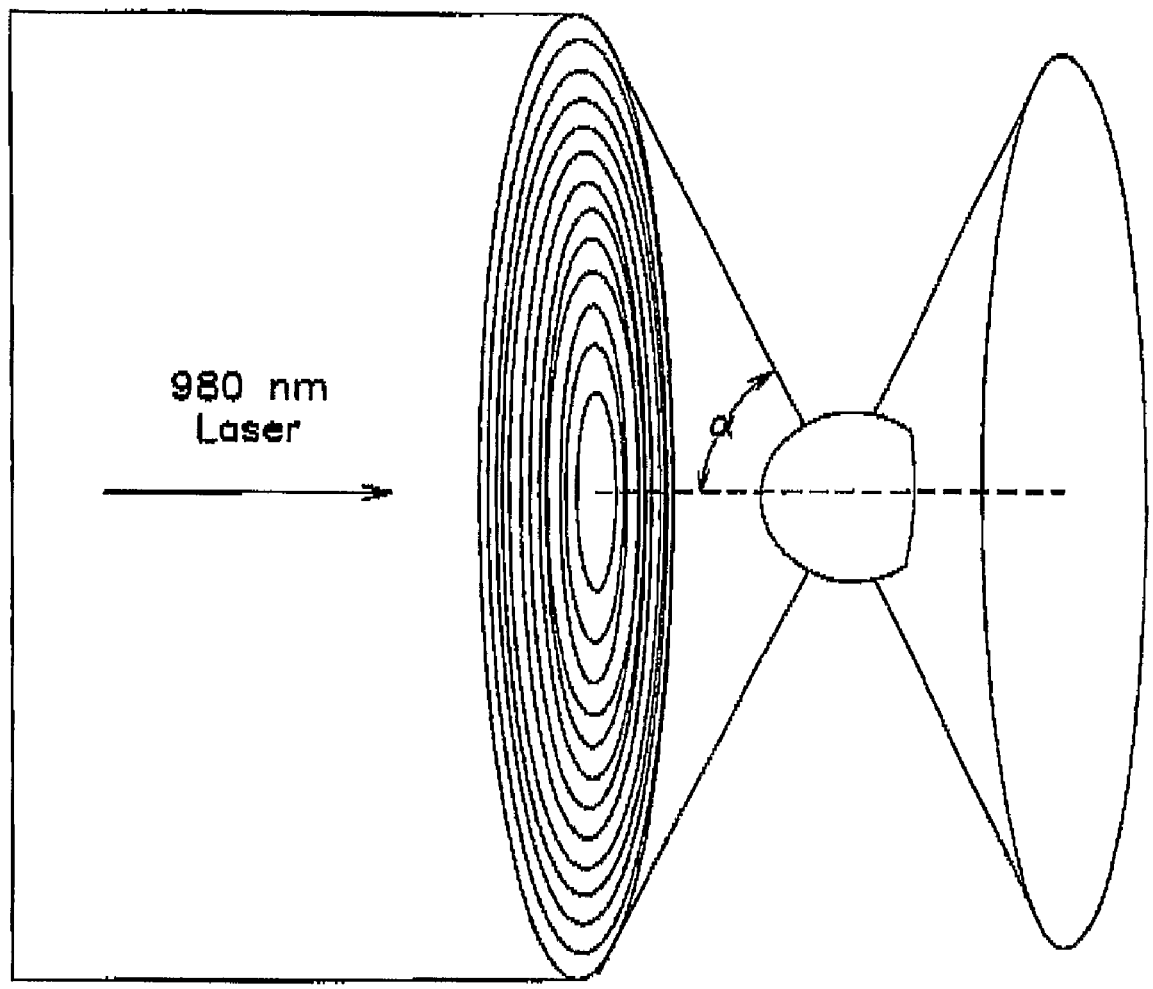
FIG. 7 illustrates irradiation of a Fresnel zone plate and a maximum focusing angle according to one embodiment of the present invention.

FIG. 7 shows an exemplary Fresnel zone plate and the maximum focusing angle α according to one embodiment of the present invention. In one exemplary implementation, a Fresnel zone plate includes 15 concentric gold rings, each 50 nm thick, with the outermost ring having a diameter of 27 μm. For incident irradiation having a wavelength of approximately 980 nm (e.g., 976 nm), a zone plate with an NA that is close to its maximum value (e.g., the refractive index of water $n_{water}$) may be fabricated using conventional electron beam lithography techniques. With a focal length of $4\lambda_o/n_{water}$, the Fresnel zone plate has an effective NA of 0.978 $n_{water}$=1.30, which means that the maximum focusing cone angle is 78°. By comparison, the cone angle of a water immersion 1.2 NA objective and an oil immersion 1.4 NA objective is 64° and 68° respectively.

Figure 8:
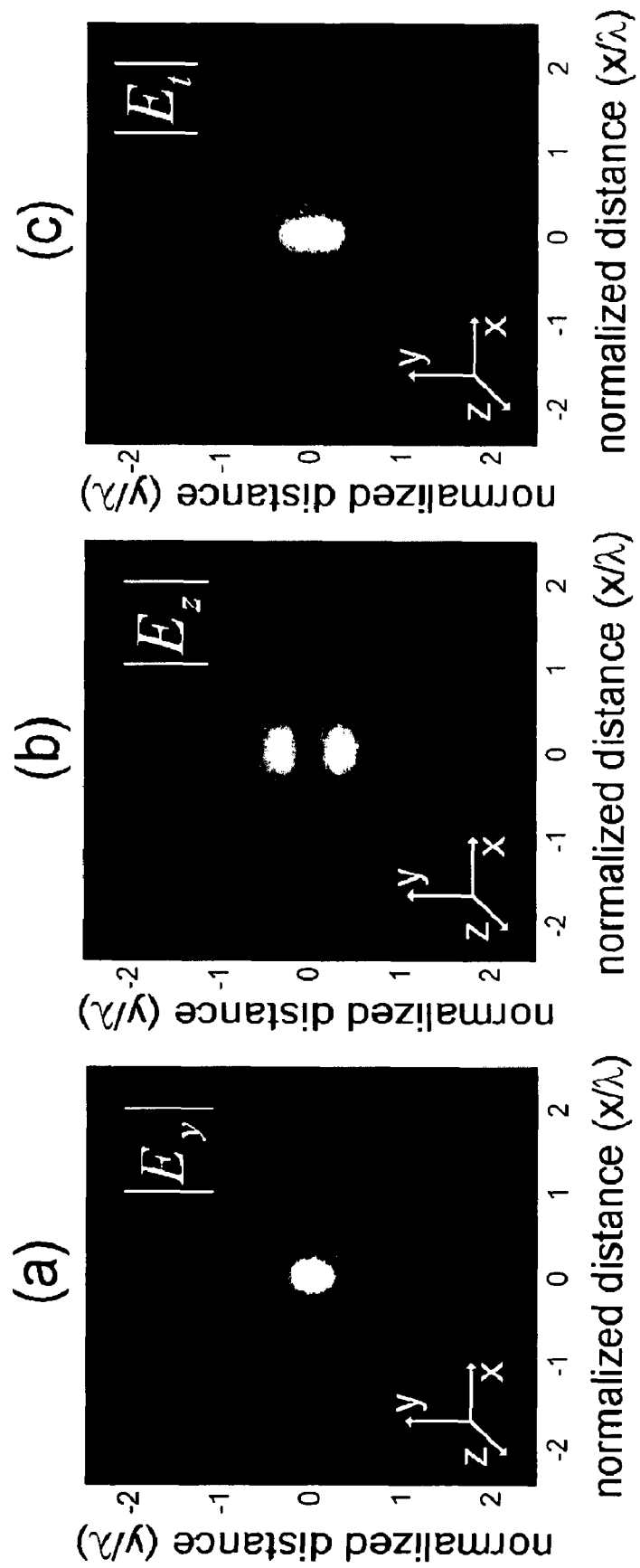
FIGS. 8(a)-8(c) illustrate field distributions of a focal spot of a Fresnel zone plate of any axial component, a z axial field component, and a total field distribution, respectively, according to one embodiment of the present invention.

A linearly polarized field for the incident radiation produces a large axial field component in a high NA focal spot. A non-paraxial beam propagation algorithm may be used, taking into account vector wave superposition, to simulate the fields produced by the Fresnel zone plate. This method accounts for the finite size of the zone plate. The transversely polarized field component, $E_y$, shown in FIG. 8(a), maintains a primarily symmetric distribution with a single dominant lobe centered on the optical axis. The spatial distribution of the axial field component, $E_z$, is not azimuthally symmetric as shown in FIG. 8(b). It has two main lobes orientated along the polarization direction that increase in amplitude proportional to the sine of the diffracted angle. Because of a zone plate's apodization factor, the amplitude of the axial field component is larger than that of an aplanatic lens, giving the focal distribution a greater ellipticity. FIG. 8(c) shows total electric field distributions of the focal spot of the Fresnel zone plate. An optical trap having a large polarization dependent stiffness may thus be implemented.

Figure 9:
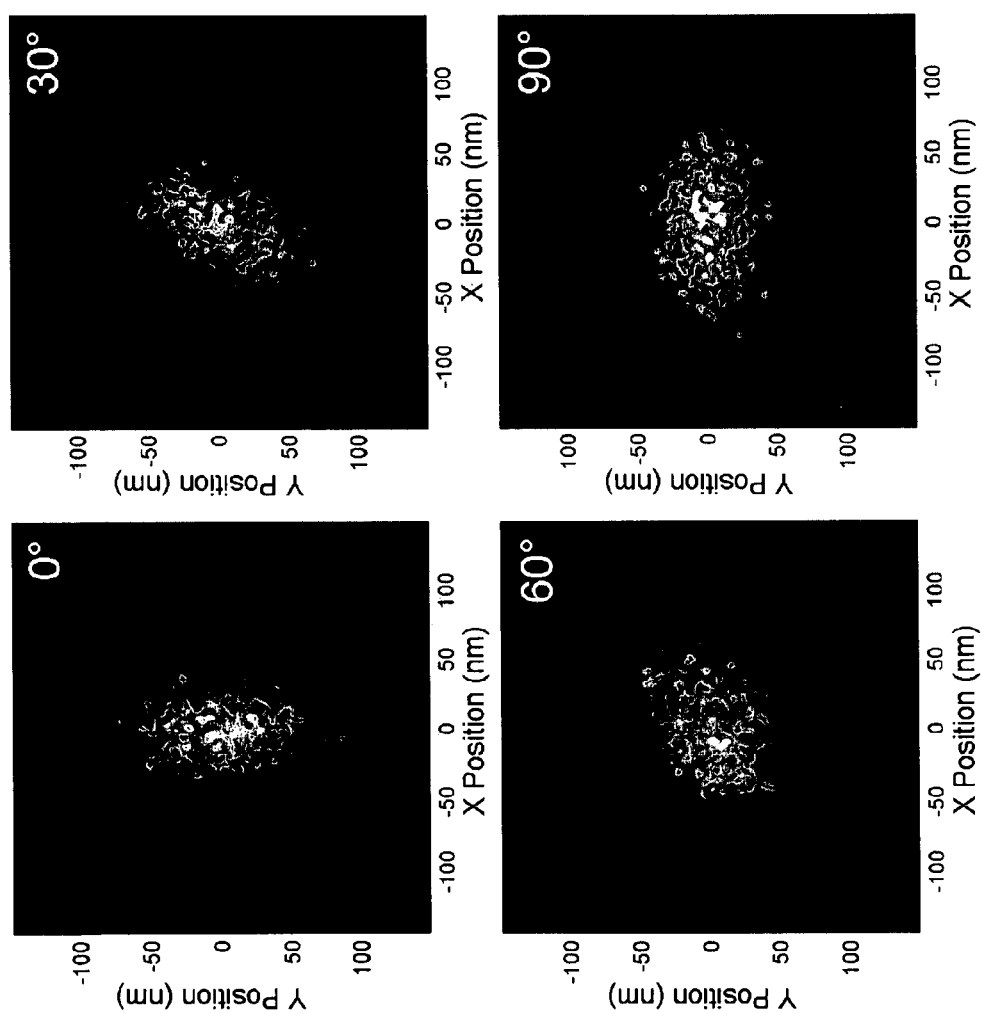
FIG. 9 illustrates histograms showing positions at 1000 instants in time of an object trapped by an optical trap using different linear polarization angles of the laser radiation used to form the optical trap, according to one embodiment of the present invention.

As described above, two-dimensional histograms of a position of a trapped object may be generated by measuring positions of the object with time. Such histograms may also be used to determine an effect of the incident linear polarization on the stiffness of the optical trap. In this embodiment, a system as shown in FIG. 4 may be employed. A position of a trapped object such as a latex fluorescent particle having a diameter of 1.1 μm and a spherical shape may be tracked. A centroid algorithm is applied to the fluorescence image obtained using the CCD camera. By measuring a position of the particle, the standard deviation of the measured position measurement is 2.5 nm. FIG. 9 shows the trapped particle distribution for four different linear polarizations of the incident beam, where θ is defined as an angle between the incident polarization and the y-axis. Images are taken at 30 Hz, with 1/64 second exposure times, for a total of 1000 frames. The centroid position of the particle for each frame is convolved with a Gaussian representing the measurement uncertainty of 2.5 nm and plotted.

From the particle position histograms of FIG. 9, the trapping stiffness can be calculated using the equipartition theorem, where the temperature of the water used as a fluid medium is assumed to be 25° C. Motion blur from the integration time of the CCD exposure reduces the measured variance of the distribution, which is corrected for using the statistics of Brownian motion in a harmonic potential. The orientation of the elliptical trap, described by the forces $F_x$ and $F_y$, rotates along with the polarization angle and is described by:

$$\begin{bmatrix} F_x \\ F_y \end{bmatrix} = \begin{bmatrix} k_{xx} & k_{xy} \\ k_{yx} & k_{yy} \end{bmatrix} \begin{bmatrix} x \\ y \end{bmatrix} \qquad (4)$$

$$= \begin{bmatrix} \cos\theta & -\sin\theta \\ \sin\theta & \cos\theta \end{bmatrix} \begin{bmatrix} k_{perp} & 0 \\ 0 & k_{par} \end{bmatrix} \begin{bmatrix} \cos\theta & \sin\theta \\ -\sin\theta & \cos\theta \end{bmatrix} \begin{bmatrix} x \\ y \end{bmatrix}$$

where $k_{xx}$ and $k_{yy}$ are the spring constants coupling displacement to force along the same direction and $k_{xy}$ and $k_{yx}$ couple displacement to force in the orthogonal direction. The stiffness along the polarization is $k_{par}$, perpendicular to the polarization is $k_{perp}$, and θ is the polarization angle relative to y. By measuring the variance along x and y and using the equipartition theorem, $k_{xx}$ and $k_{yy}$ may be evaluated as a function of θ. Fitting the data to Equation (4), $k_{perp}$ and $k_{par}$ may be found to have a stiffness of 8.21 pN/μm and 2.98 pN/μm, respectively, for a laser power of 40 mW. The diffracted power in the focal spot is estimated to be 2 mW due to the zone plate diffraction efficiency ($1/\pi^2$) and overfilling of the back aperture. Using these values for $k_{perp}$ and $k_{par}$, a stiffness tensor k can be evaluated for any angle θ.

Figure 10:
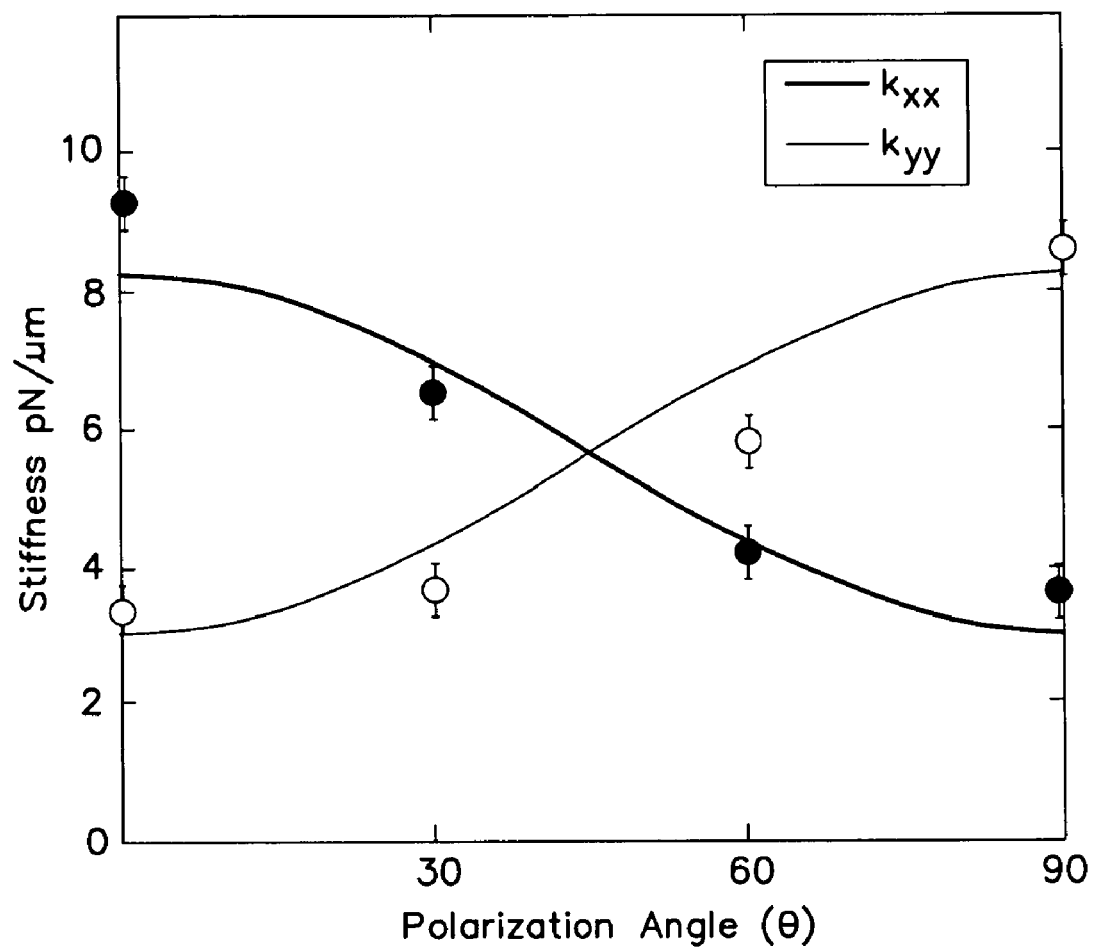
FIG. 10 is a graph of a polarization modulation of a spring constant of an optical trap, according to one embodiment of the present invention.

FIG. 10 shows both the experimental data obtained as described above and the results of fitting to the rotation matrix model using least-squares fitting. By changing the linear polarization angle, the stiffness of the optical trap can be modulated by a factor of 2.75 without changing the incident power or location of the trap center. Uncertainty in the variance due to a finite number of measurements produces the error bars also shown in FIG. 10. In this experiment, there is some asymmetry between $k_{xx}$ and $k_{yy}$, with the maximum value of $k_{yy}$ being smaller. This is consistent with the Applicants' observation of convection currents in y, which arise from the heating of the gold and, consequently, the water.

Heating of the water also adds uncertainty to force calibration due to temperature fluctuations. The magnitude by which the force can be modulated using linear polarization angle is a function of the difference between $k_{perp}$ and $k_{par}$. This anisotropy is enhanced by the focal spot ellipticity, but may also depend on a size of the trapped particle.

According to yet another embodiment of the present invention, optical trapping apparatus as discussed above (including one or more Fresnel zone plates) may be integrated with microfluidic structures for a variety of applications. Conventional optical tweezers based on a microscope objective lens have a large size and cost, short working distance, and limited field of view that essentially precludes practical integration of such tweezers with microfluidic devices. By contrast, a Fresnel zone plate is characterized by a smaller cross section, thickness, and weight than a microscope objective lens. Therefore, optical tweezers that employ a Fresnel zone plate are well suited to be used in microfluidic structures such as, for example, chambers or channels. In addition, in some embodiments, the microfluidic structures may have geometries more complex than chambers and channels. Optical traps based on Fresnel zone plates may be embedded inside microfluidic structures without the limitation of an immersion objective's short working distance. In addition, because trapping is decoupled from imaging, trapped objects may be translated while remaining fixed relative to a substrate or surface of a microfluidic structure.

Figure 11:
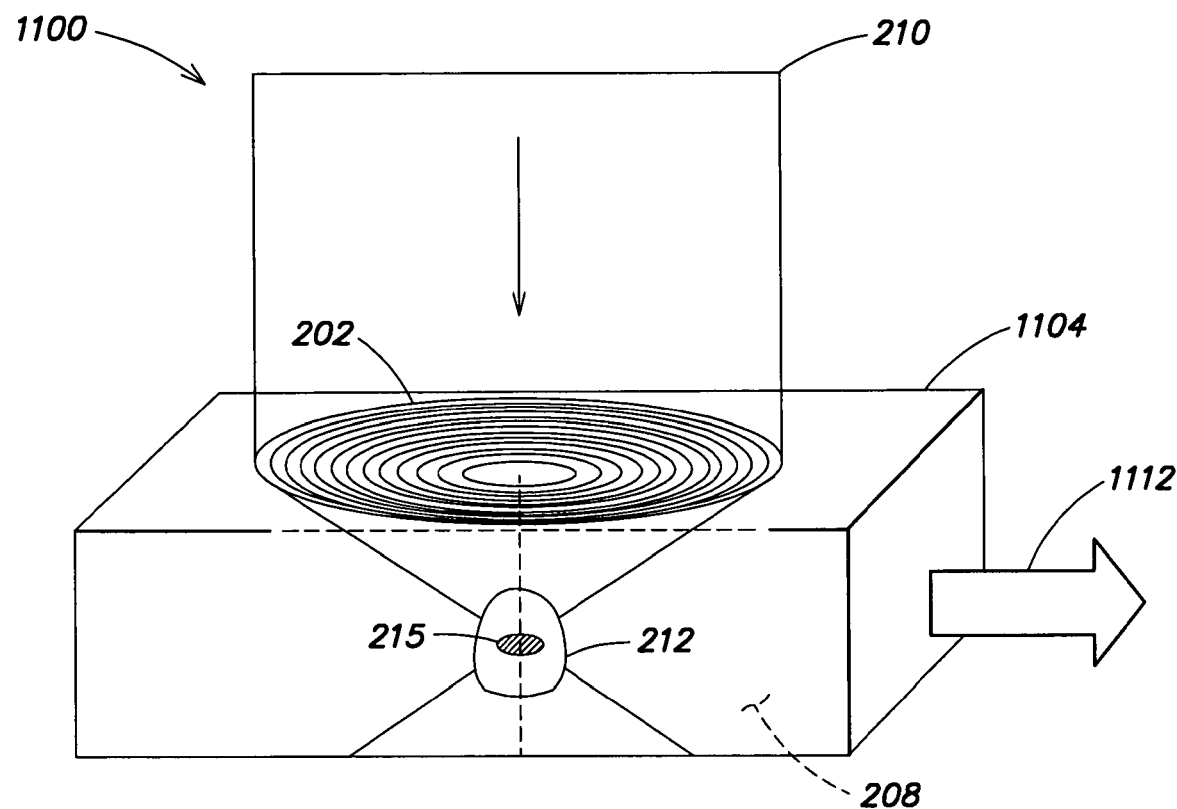
FIG. 11 is a diagram of an optical tweezers using a Fresnel zone plate integrated with a microfluidic chamber, according to one embodiment of the present invention.
Figure 12:
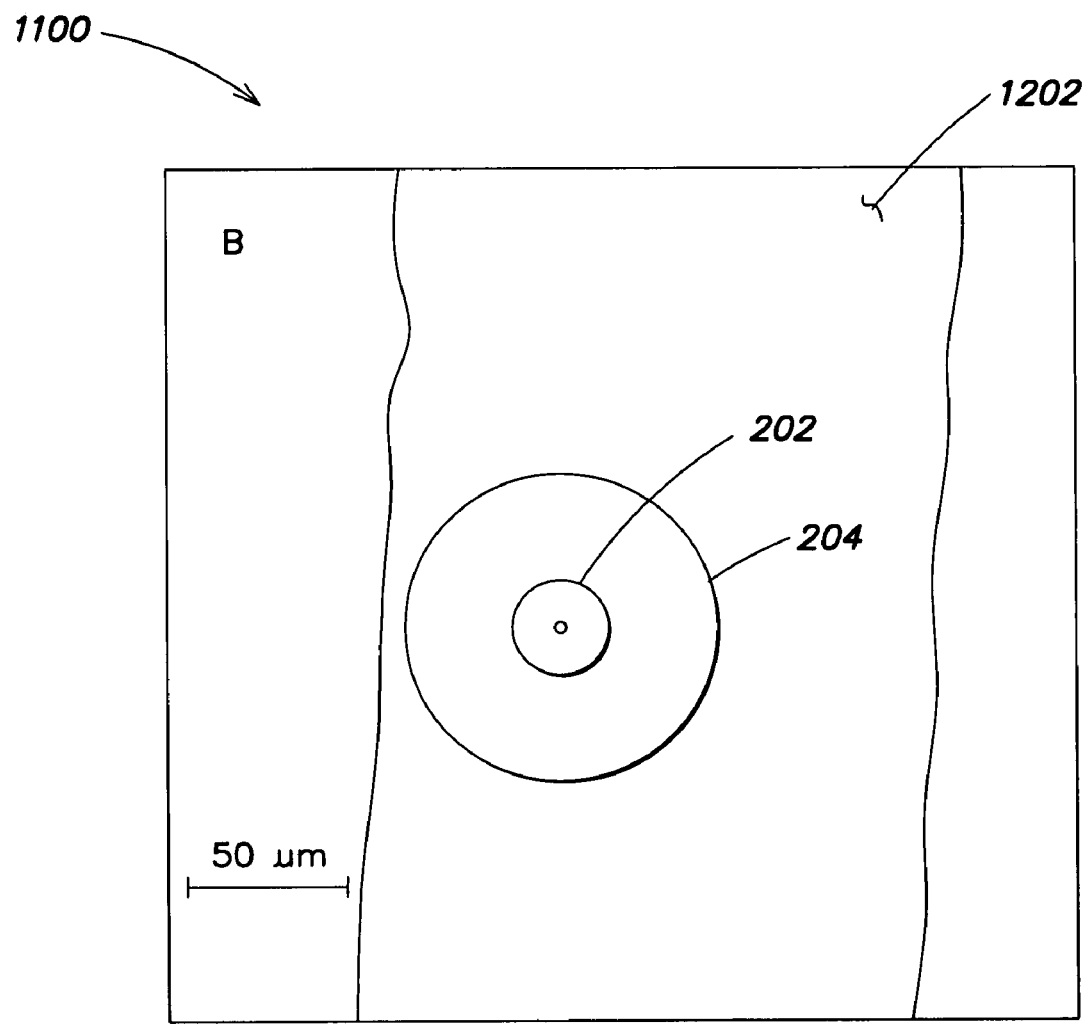
FIG. 12 shows a SU8 Fresnel zone plate integrated with a PDMS microfluidic channel, according to one embodiment of the present invention.

FIG. 11 illustrates an optical trapping apparatus 1100 according to another embodiment of the present invention, wherein a Fresnel zone plate 202 is disposed on at least a portion of a chamber 1104 containing a fluid medium 208. An object 212 (e.g., a polystyrene bead) is trapped at a focal spot 215 formed upon irradiation of Fresnel zone plate 202 with laser radiation 210. In various aspects, the chamber 1104 may be a microfluidic structure such as a channel or cell through which a fluid may be admitted, released and/or flown (a direction of channel exemplary flow is shown with an arrow 1112). It should be appreciated that the microfluidic chamber may have any suitable dimensions. Also, the chamber may have any suitable shape, including cylindrical, spherical, and others. FIG. 12 illustrates one example on a scale of micrometers of a Fresnel zone plate 202 disposed on one surface (e.g., a wall) of a microfluidic channel 1104.

In one exemplary implementation of the apparatus 1100 shown in FIG. 11, the Fresnel zone plate 202 may be fabricated using a polymer such as a photoresistive polymer SU8. One or more of such zone plates may be integrated with a polydimethylsiloxane (PDMS) microfluidic channel 1202, as shown in FIG. 12. In the example illustrated in FIG. 12, the Fresnel zone plate has a focal length of $8\lambda_n$, where $\lambda$ is the wavelength of the incident laser irradiation which is 976 nm in vacuum and 735 nm in water. The SU8 Fresnel zone plate is patterned on substrate 204 using the electronic beam lithography of a 650 nm layer of SU8 2000.5. The substrate is then adhered to a surface of a 200 μm wide and 100 μm deep PDMS microfluidic channel 1104.

The apparatus 1100 shown in FIGS. 11 and 12 may be employed in the system shown in FIG. 4 of the apparatus 200. In one aspect, the Fresnel zone plate may be disposed on a surface inside the channel 1104 to create a focal spot within a fluid medium disposed in the channel. In one exemplary implementation, the physical aperture of the SU8 Fresnel zone plate is 30.7 μm which results in a numerical aperture of 1.24. Because the Fresnel zone plate is placed on the inside of the microfluidic channel, the focused light therefore does not have to cross an interface. Thus, the focused light may be free of spherical aberration, which is typically a problem for oil immersion objective lenses. For a two level phase diffractive element, the maximum diffraction efficiency is $4/\pi^2$, or approximately 40%, and this is obtained when the phase step is $\pi$, which for an SU8 grating in water requires a grating that is 2 μm deep. Using a Fourier beam propagation algorithm, a focal spot size for this lens is calculated to have a full width at half maximum of 353×507 nm in directions perpendicular and parallel to the incident polarization, respectively. In the direction perpendicular to the incident polarization, the zone plate produces a focal spot that is 50 nm smaller than that produced by a 1.2 NA water immersion lens.

Figure 13A:
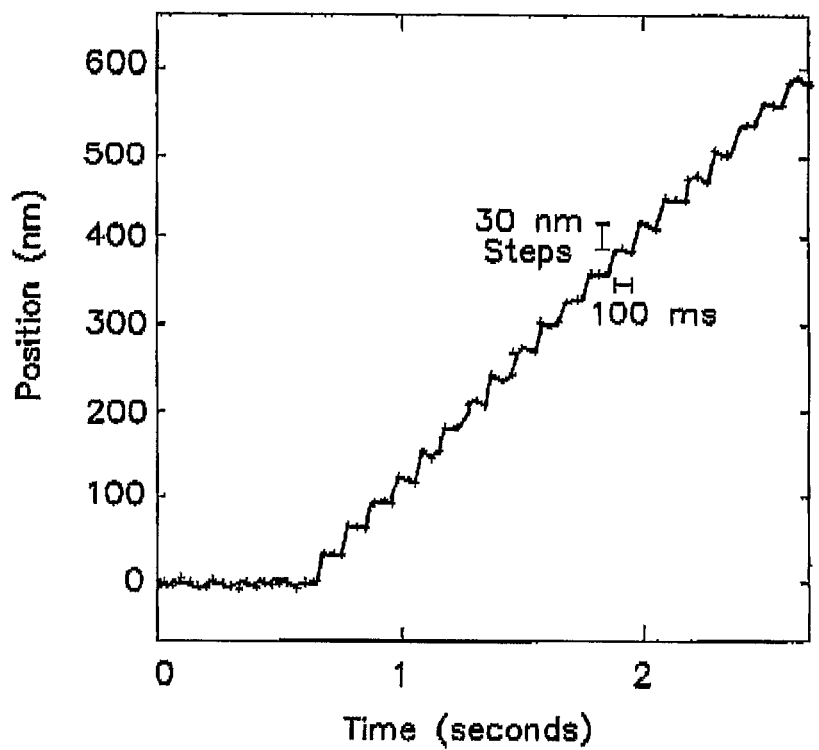
FIG. 13(a) is a plot of measurements of a position of an object fixed to a bottom surface of a microfluidic channel as the object moves in 30 nm steps by a piezo stage, according to one embodiment of the present invention.
Figure 13B:
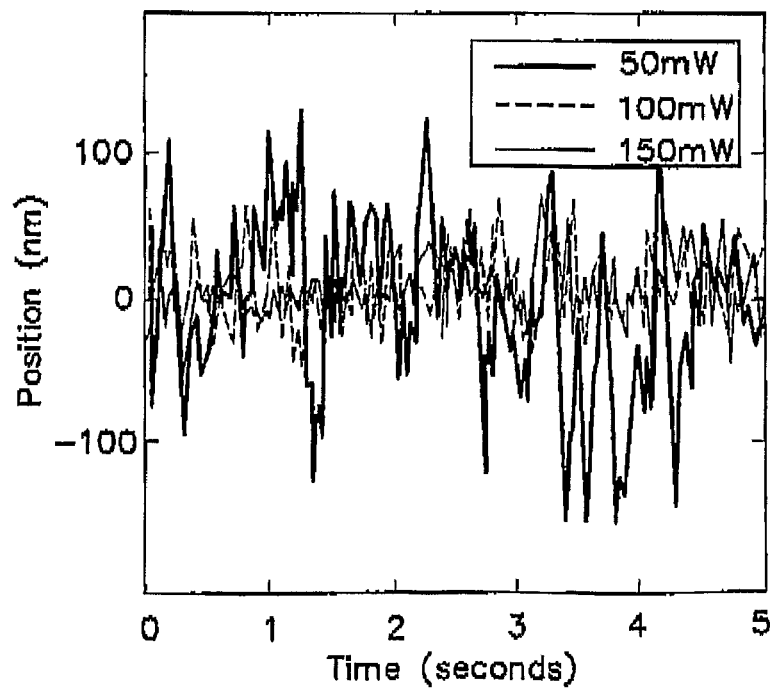
FIG. 13(b) is a plot of measurements of a position of an object trapped by an optical trap integrated into a microfluidic channel as a function of a level of laser power, according to one embodiment of the present invention.

Analysis of the fluorescent images obtained from an optical tweezers system of FIG. 4 employing the apparatus 1100 of FIGS. 11 and 12 allows evaluating performance of the optical trap by determining the bead position as a function of time. Position measurements are calibrated by observing a bead fixed to the bottom surface of the microfluidic channel as it is moved in 30 nm steps by a piezo stage, as shown in FIG. 13(a). In this analysis, the piezo stage is driven at 10 Hz. The fluorescence images may be filtered to remove small amplitude noise and a centroid algorithm is used to determine bead position. The standard deviation in the position of a bead fixed to the substrate is 5 nm, which represents the measurement accuracy. FIG. 13(b) shows position measurements of a trapped bead for three different laser powers. The position variance clearly decreases with increasing trapping power as expected. At levels of laser power above 100 mW, the trapping stiffness is found to be linear with laser power, giving a power normalized value of approximately 0.05 pN/(μm mW). At 150 mW, the bead has a 23 nm standard deviation in its position measured transverse to the channel, which corresponds to a 7.8 pN/μm trapping stiffness.

Figure 14A:
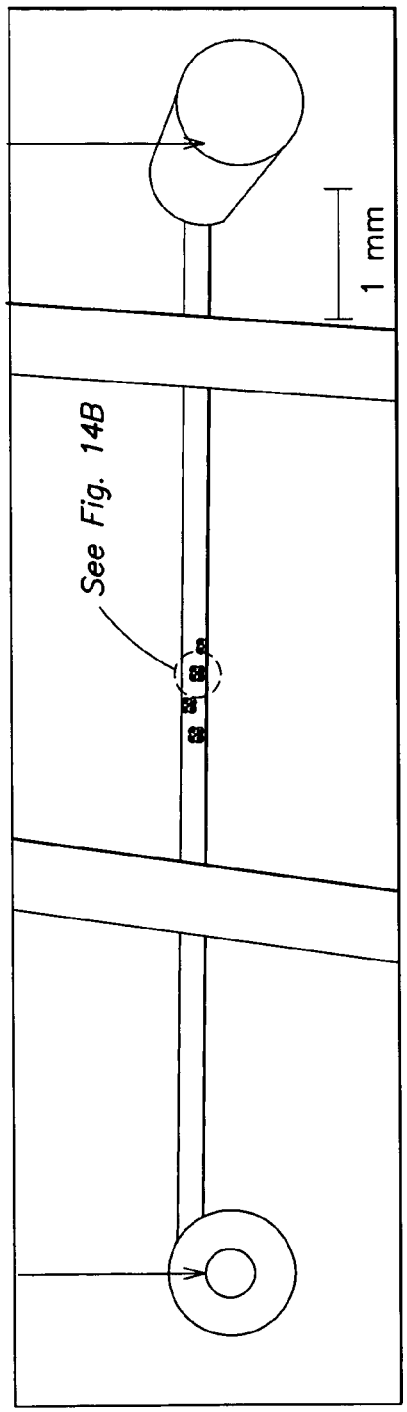
FIG. 14 shows a microfluidic channel including one or more arrays of Fresnel zone plates, according to one embodiment of the present invention.
Figure 14B:
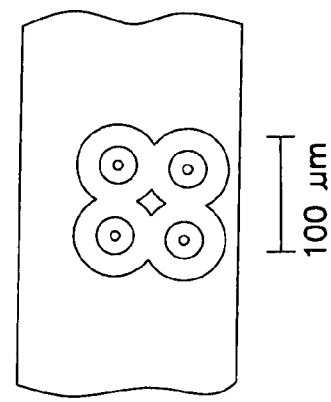

In yet other embodiments of the present invention, multiple Fresnel zone plates may be placed in a microfluidic structure such as a microfluidic chamber or channel to assess fluid dynamics within the structure. FIG. 14 shows a microscopic image of a microfluidic channel 1400 including one or more arrays 1402 of Fresnel zone plates. Channel 1400 may be, for example, a 200 μm wide and 100 μm deep PDMS microfluidic channel. Each array may have, for example, four Fresnel zone plates, as shown in the magnified inset of FIG. 15. Objects disposed in a fluid medium of channel 1400 with a flow applied from an inlet 1406 to an outlet 1408 may be trapped by Fresnel zone plates of arrays 1402. Tracking positions of the trapped objects may allow determining various properties of the fluid medium in the channel.

When one or more Fresnel zone plates are disposed (e.g., patterned on an inner surface) in a microfluidic chamber or channel, objects suspended in the fluid medium may be optically trapped in three dimensions. Position tracking of trapped objects undergoing Brownian motion gives information about the local fluid environment and may facilitate spatially resolving various fluid properties. Thus, such properties of the fluid medium as a velocity, a refractive index, a viscosity, and a temperature of the fluid may be determined.

In some embodiments of the present invention, multiple Fresnel zone plates may be employed to produce multiple focal spots for optical trapping of fluid-bone objects. More than one Fresnel zone plate may be configured to form an array that may be employed in various applications. For example, trapped objects can be used as local probes that measure various fluid properties. It should be appreciated that in the arrays, Fresnel zone plates may be arranged in any suitable manner. Also, any suitable number of the same or different Fresnel zone plates may be used to form an array.

In one embodiment of the present invention, optical traps using Fresnel zone plates placed in proximity to a fluid medium including objects to be trapped may be utilized for sorting the objects. The objects may be sorted based on their size, refractive index, and on properties of the fluid medium. For example, when a size of an object exceeds certain limit, the object may be deflected if a trapping force of an optical trap exceeds a fluid flow force.

In some embodiments of the present invention, objects may be trapped at various distributed locations in a microfluidic system and a trap extension of each object may be measured as a function of fluid flow. The trap extension may be defined as a location of the trapped object relative to a center of the focal spot, and may be linearly proportional to the local velocity of the surrounding fluid.

In some embodiments of the present invention, pH distribution and gradients of the fluid medium of a microfluidic channel may be determined using Fresnel zone plates. Objects to be trapped may be disposed in a region of interest in the channel to serve as pH sensors. Certain fluorescent dies that have emission characteristics that are dependent on their local fluidic environment may be used to impregnate or coat the objects. The rate at which photons are emitted from these fluorescent dyes may be proportional to the local pH around the dye molecule. An intensity of the fluorescence signal of these objects once trapped may be measured to assess a pH of the fluid medium at multiple locations.

In another embodiment of the present invention, a single Fresnel zone plate may be configured to form more than one focal spot upon irradiation for trapping more than one fluid-borne object. Thus, some embodiments of the present invention provide an optical trapping system wherein more than one focal spot is produced by a single Fresnel zone plate. The focal spots may have the same focal lengths or, alternatively, may have different focal lengths and amplitude weights.

The geometry of a Fresnel zone plate can be derived by considering the complex amplitude of a spherical wave described as follows:

$$U = A_o e^{jk\sqrt{(x-x_o)^2 + (y-y_o)^2 + (z-z_o)^2}}, \quad (5)$$

where the spherical wave originates from $(x_o, y_o, z_o)$ with amplitude $A_0$, and k is the wave vector. The position $(x_o, y_o)$ defines a transverse location of the focal spot and $(z-z_o)$ defines the focal length (f). If $A_o$ is a uniform amplitude, the diffractive element is only responsible for imparting a phase on the incident wave. The phase angle is defined as:

$$\angle U = k\sqrt{(x-x_o)^2 + (y-y_o)^2 + f^2}. \quad (6)$$

The phase angle is a continuous valued function that has values modulo $2\pi$. In order for a two-level lithographic mask (amplitude or phase) to describe this function, a threshold condition may be applied. The simplest threshold condition is that any phase angle from $[-\pi, 0]$ is represented by zero and any phase angle from $[0, \pi]$ is represented by a one. Further, when the amplitude of the function is not constant, more accurate threshold conditions may be used.

Using the formalism described above, a Fresnel zone plate may be configured to produce multiple focal spots at arbitrary transverse positions as well as focal lengths. To this end, the complex amplitude U is the summation of several spherical waves instead of one:

$$U_t = \sum_{n=1}^{t} U_n, \quad (7)$$

where $U_n$ is the complex described by Equation 5, and $U_t$ is the total field described by the diffractive element. The same procedure may then be followed by first evaluating the phase angle and then taking a threshold. For the summation of multiple fields the amplitude may not be constant. A commonly used more accurate threshold condition is $\cos(\sin^{-1}(A_o))$, where $A_o$ has been normalized to the fields largest value. This threshold condition may provide an exact reconstruction in the first grating order.

Figure 15A:
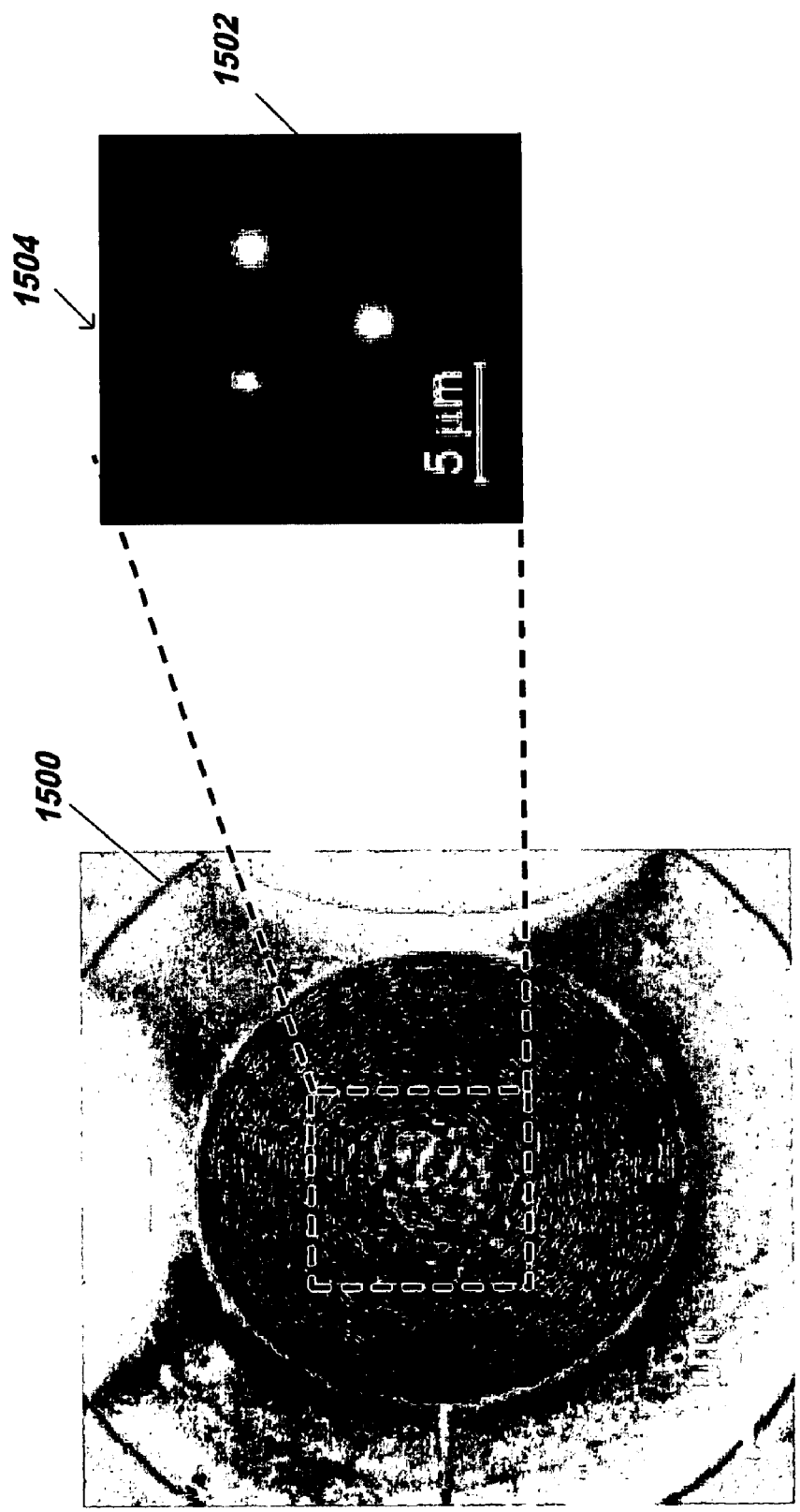
FIGS. 15(a) and 15(b) show examples of a single Fresnel zone plate according to one embodiment of the present invention used to trap multiple objects, and a fluorescent image of the trapped objects.

Thus, some embodiments of the invention provide a single Fresnel zone plate that produces multiple focal spots at different transverse positions as well as depths to create a multi-object optical trapping system. In these embodiments, in addition to changing the amplitude component $A_o$ of each spherical wave, the relative amplitude of each focal spot may be modified. FIG. 15(a) shows a Fresnel zone plate 1500 that is used to trap three objects 1504, as shown in a fluorescent image 1502. Objects 1504 have different focal lengths and have been trapped 4, 6 and 8 μm above the Fresnel zone plate.

Figure 15B:
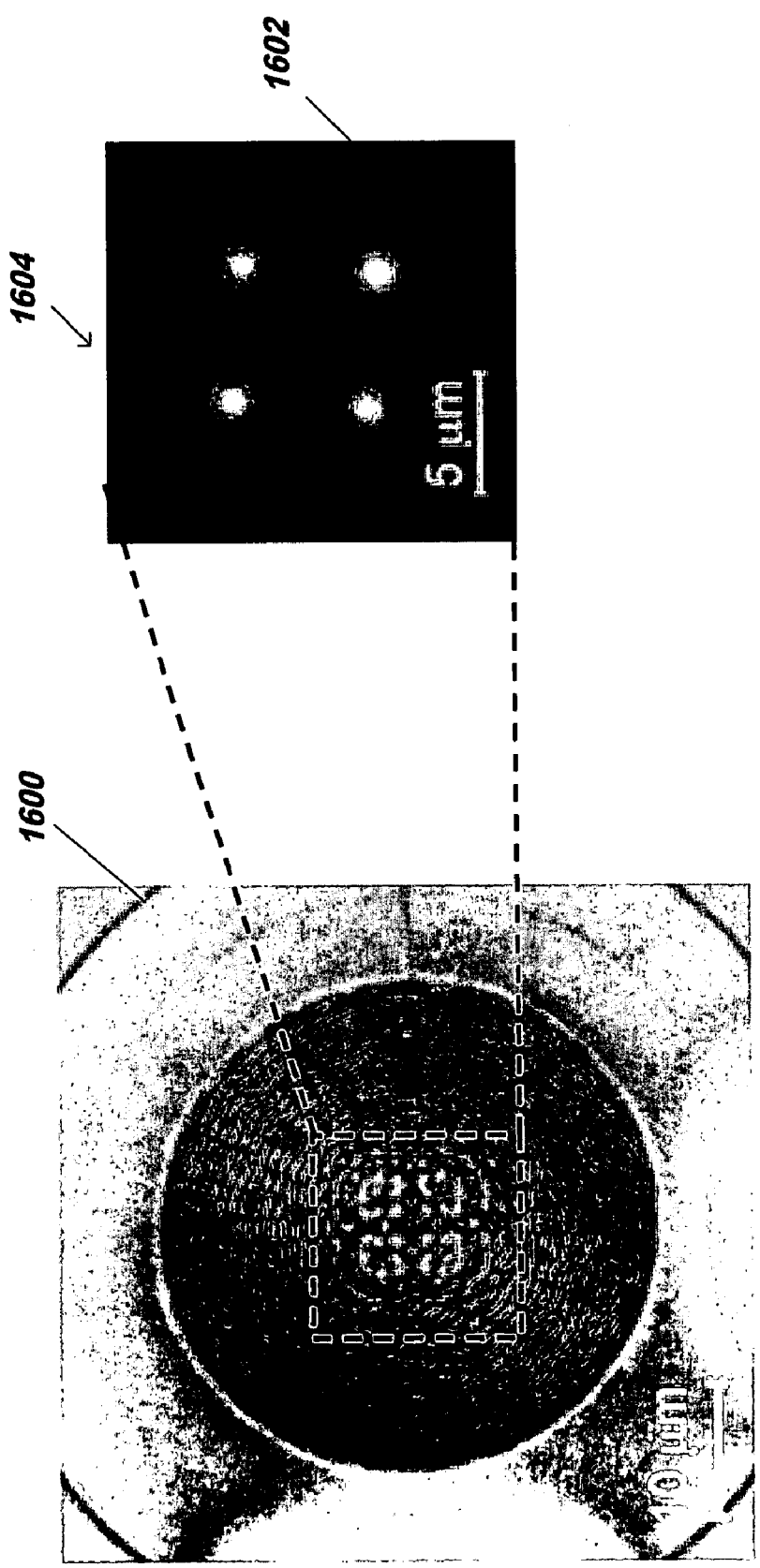

As another example, FIG. 15(b) shows a Fresnel zone plate 1600 that is configured to trap four objects 1604 which are fluorescent latex beads of 1.1 μm in diameter, as shown in a fluorescent image 1602. In this example, the four focal spots have the same amplitude and distance normal to the zone plate of 6 μm. The transverse positions of the objects are (−3, −3), (−3, 3), (3, −3), and (3, 3) μms, respectively.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or"

clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical trapping method, comprising:
A) placing at least one Fresnel zone plate in proximity to a fluid medium, wherein at least one fluid-borne object is disposed in the fluid medium;
B) irradiating the at least one Fresnel zone plate with at least first radiation so as to form at least one focal spot of the first radiation within the fluid medium for trapping the at least one fluid-borne object; and
C) irradiating the at least one fluid-borne object with at least second radiation to move the at least one fluid-borne object into the at least one focal spot.

2. The optical trapping method of claim 1, wherein the at least one fluid-borne object comprises at least one of a dielectric object, a semiconductor object, a metallic object and a biological object.

3. The optical trapping method of claim 1, wherein the at least one fluid-borne object has a diameter of less than or equal to 2 µm.

4. The optical trapping method of claim 1, wherein the at least one Fresnel zone plate is disposed on at least one surface of a chamber containing the fluid medium.

5. The optical trapping method of claim 4, wherein the at least one Fresnel zone plate is disposed on an inner surface of the chamber containing the fluid medium.

6. The optical trapping method of claim 1, further comprising:
D) varying a stiffness of a trap formed by at least one force exerted upon the at least one fluid-borne object by the at least one focal spot.

7. The optical trapping method of claim 6, wherein D) comprises changing a power of the first radiation so as to vary the stiffness of the trap.

8. The optical trapping method of claim 6, wherein D) comprises changing a linear polarization angle of the first radiation so as to vary the stiffness of the trap.

9. The optical trapping method of claim 1, further comprising:
D) determining a position of the at least one fluid-borne object once trapped in the at least one focal spot.

10. The optical trapping method of claim 9, wherein D) comprises measuring the position of the at least one fluid-borne object relative to a center of the at least one focal spot.

11. The optical trapping method of claim 1, further comprising:
D) tracking a position of the at least one fluid-borne object once trapped in the at least one focal spot.

12. The optical trapping method of claim 11, further comprising:
E) determining a stiffness of a trap formed by at least one force exerted upon the at least one fluid-borne object by the at least one focal spot.

13. The optical trapping method of claim 12, wherein E) comprises varying a flow velocity of the fluid medium so as to determine the stiffness of the trap.

14. The optical trapping method of claim 1, further comprising:
D) sorting the at least one fluid-borne object based on a position of the at least one focal spot.

15. An optical trapping apparatus, comprising:
a chamber for carrying a fluid medium;
at least one Fresnel zone plate disposed on at least a portion of the chamber,
a first radiation source configured to irradiate the at least one Fresnel zone plate with first radiation to create at least one focal spot; and
a second radiation source configured to produce second radiation focused independently of the first radiation source and configured to move a fluid-borne object disposed in the fluid medium into the at least one focal spot.

16. The optical trapping apparatus of claim 15, wherein the chamber comprises a PDMS chamber.

17. The optical trapping apparatus of claim 16, wherein the at least one Fresnel zone plate comprises SU8 polymer.

18. The optical trapping apparatus of claim 15, wherein the fluid medium comprises water.

19. The optical trapping apparatus of claim 15, wherein the at least one Fresnel zone plate comprises metal.

20. The optical trapping apparatus of claim 19, wherein the metal comprises gold.

21. The optical trapping apparatus of claim 15, wherein the at least one Fresnel zone plate comprises at least one photoresistive polymer.

22. The optical trapping apparatus of claim 21, wherein the at least one photoresistive polymer comprises SU8 polymer.

23. The optical trapping apparatus of claim 15, wherein the first radiation comprises laser radiation produced by fiber-coupled diode laser.

24. The optical trapping apparatus of claim 15, wherein the at least one Fresnel zone plate has a focal length approximately in a range from 6 µm to 8 µm for radiation having a wavelength approximately in a range from 970 to 990 nm incident to the at least one Fresnel zone plate.

25. The optical trapping apparatus of claim 15, wherein the at least one Fresnel zone plate comprises a plurality of Fresnel zone plates.

26. The optical trapping apparatus of claim 25, wherein the apparatus is configured such that, upon irradiation of the plurality of Fresnel zone plates with the first radiation, a plurality of focal spots of the first radiation including the at least one focal spot are formed within the fluid medium for trapping the at least one fluid-borne object.

27. The optical trapping apparatus of claim 15, wherein:
the at least one Fresnel zone plate comprises a single Fresnel zone plate; and
the apparatus is configured such that, upon irradiation of the single Fresnel zone plate with the first radiation, a plurality of focal spots of the first radiation including the at least one focal spot are formed within the fluid medium for trapping a plurality of fluid-borne objects including the fluid-borne object.

28. The optical trapping apparatus of claim 27, wherein at least two of the plurality of focal spots have different focal lengths.

29. The optical trapping apparatus of claim 27, wherein the plurality of focal spots have a same focal length.

* * * * *

UNITED STATES PATENT AND TRADEMARK OFFICE
CERTIFICATE OF CORRECTION

PATENT NO. : 8,368,008 B2  
APPLICATION NO. : 12/679436  
DATED : February 5, 2013  
INVENTOR(S) : Ethan Schonbrun et al.

Page 1 of 1

It is certified that error appears in the above-identified patent and that said Letters Patent is hereby corrected as shown below:

In the Specifications:

At column 1, line 21, delete the paragraph reading
"Some of the research relating to the subject matter disclosed herein was sponsored by the United States National Science Foundation and the Defense Advanced Research Projects Agency (DARPA) Grant No. HR001-06-1-0044, and the United States government has certain rights to some disclosed subject matter."

and replace it with

--Some of the research relating to the subject matter disclosed herein was sponsored by the United States National Science Foundation Grant Nos. PHY-0117795 and PHY-0646094 and the Defense Advanced Research Projects Agency (DARPA) Grant No. HR0011-06-1-0044, and the United States government has certain rights to some disclosed subject matter--

Signed and Sealed this
Twenty-fifth Day of June, 2013

Teresa Stanek Rea
*Acting Director of the United States Patent and Trademark Office*